United States Patent
Pokrass et al.

(10) Patent No.: US 12,070,897 B2
(45) Date of Patent: Aug. 27, 2024

(54) ADDITIVE MANUFACTURING EMPLOYING POLYIMIDE-CONTAINING FORMULATIONS

(71) Applicant: Stratasys Ltd., Rehovot (IL)

(72) Inventors: Mariana Pokrass, Rehovot (IL); Omer Sinwani, Petach-Tikva (IL); Shai Sultan, Moshav Ganei Tal (IL); Lev Kuno, Tzur-Hadassah (IL); Gil Shelef, Kibbutz Negba (IL)

(73) Assignee: Stratasys Ltd., Rehovot (IL)

( * ) Notice: Subject to any disclaimer, the term of this patent is extended or adjusted under 35 U.S.C. 154(b) by 411 days.

(21) Appl. No.: 16/958,713

(22) PCT Filed: Dec. 27, 2018

(86) PCT No.: PCT/IL2018/051401
§ 371 (c)(1),
(2) Date: Jun. 28, 2020

(87) PCT Pub. No.: WO2019/130310
PCT Pub. Date: Jul. 4, 2019

(65) Prior Publication Data
US 2021/0008793 A1    Jan. 14, 2021

Related U.S. Application Data

(60) Provisional application No. 62/610,983, filed on Dec. 28, 2017.

(51) Int. Cl.
*B29C 64/129*    (2017.01)
*B29C 64/209*    (2017.01)
(Continued)

(52) U.S. Cl.
CPC .......... *B29C 64/129* (2017.08); *B29C 64/209* (2017.08); *B29C 64/277* (2017.08);
(Continued)

(58) Field of Classification Search
CPC ............... B29C 64/129; B29C 64/209; B29C 64/277; B29C 64/393; B29C 64/124;
(Continued)

(56) References Cited

U.S. PATENT DOCUMENTS

| 4,812,511 A | 3/1989 | Domeier |
| 6,259,962 B1 | 7/2001 | Gothait |

(Continued)

FOREIGN PATENT DOCUMENTS

| EP | 1344789 | 9/2003 |
| EP | 1857478 | 9/2009 |

(Continued)

OTHER PUBLICATIONS

Notice of Reasons for Rejection Dated Jul. 8, 2022 From the Japan Patent Office Re. Application No. 2014-513308 and Its Translation Into English. (19 Pages).

(Continued)

*Primary Examiner* — S. Behrooz Ghorishi

(57) ABSTRACT

A method of additive manufacturing of a three-dimensional object, comprises: dispensing from a first array of nozzles a modeling material formulation containing a polyimide precursor to form a layer in a configured pattern corresponding to a shape of a slice of the object; applying to the layer ultraviolet radiation and infrared radiation from two different radiation sources; and repeating the dispensing and the application of radiation to form a plurality of layers in configured patterns corresponding to shapes of other slices of the object. Optionally, an additional modeling material formulation or a support material formulation is dispensed from a second array of nozzles.

22 Claims, 21 Drawing Sheets

(51) Int. Cl.
| | |
|---|---|
| *B29C 64/277* | (2017.01) |
| *B29C 64/393* | (2017.01) |
| *B29K 79/00* | (2006.01) |
| *B33Y 10/00* | (2015.01) |
| *B33Y 30/00* | (2015.01) |
| *B33Y 50/02* | (2015.01) |
| *C08G 73/12* | (2006.01) |

(52) U.S. Cl.
CPC ............ *B29C 64/393* (2017.08); *B33Y 10/00* (2014.12); *B33Y 30/00* (2014.12); *B33Y 50/02* (2014.12); *C08G 73/128* (2013.01); *B29K 2079/08* (2013.01)

(58) Field of Classification Search
CPC ......... B33Y 10/00; B33Y 30/00; B33Y 50/02; C08G 73/128; C08G 73/12; B29K 2079/08
See application file for complete search history.

(56) References Cited

U.S. PATENT DOCUMENTS

| | | | |
|---|---|---|---|
| 6,569,373 | B2 | 5/2003 | Napandensky |
| 6,658,314 | B1 | 12/2003 | Gothait |
| 6,850,334 | B1 | 2/2005 | Gothait |
| 7,300,619 | B2 | 1/2007 | Napadensky et al. |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 9,031,680 | B2 | 5/2015 | Napadensky |
| 9,227,365 | B2 | 1/2016 | Dikovsky et al. |
| 2006/0111807 | A1* | 5/2006 | Gothait ................. B29C 64/393 700/119 |
| 2007/0270568 | A1* | 11/2007 | Ushiki ................. C09D 11/101 528/170 |
| 2010/0191360 | A1 | 7/2010 | Napadensky |
| 2015/0337147 | A1 | 11/2015 | Mayo et al. |
| 2017/0100817 | A1 | 4/2017 | Ganapathiappan et al. |
| 2017/0203508 | A1 | 7/2017 | Dikovsky et al. |
| 2017/0319746 | A1* | 11/2017 | Lutolf .................... B29C 64/112 |
| 2018/0147773 | A1* | 5/2018 | Kalyanaraman ...... B29C 64/118 |
| 2019/0127599 | A1* | 5/2019 | Chen ................... C08F 293/005 |
| 2020/0062952 | A1* | 2/2020 | Nguyen ................. C08L 33/10 |
| 2020/0283548 | A1 | 9/2020 | Stansbury |
| 2021/0070941 | A1 | 3/2021 | Kuno et al. |

FOREIGN PATENT DOCUMENTS

| | | |
|---|---|---|
| EP | 2277686 | 1/2011 |
| JP | 2008-13772 | 1/2008 |
| JP | 2012-140582 | 7/2012 |
| WO | WO 2016/151586 | 9/2016 |
| WO | WO 2016/193933 | 12/2016 |
| WO | WO 2016/193934 | 12/2016 |
| WO | WO 2017/019374 | 2/2017 |
| WO | WO 2017/027482 | 2/2017 |
| WO | WO 2018/011674 | 1/2018 |
| WO | WO 2019/130310 | 7/2019 |
| WO | WO 2019/130312 | 7/2019 |

OTHER PUBLICATIONS

Restriction Official Action Dated Oct. 19, 2022 From the US Patent and Trademark Office Re. U.S. Appl. No. 16/958,169. (7 Pages).
International Preliminary Report on Patentability Dated Jul. 9, 2020 From the International Bureau of WIPO Re. Application No. PCT/IL2018/051401. (9 Pages).
International Preliminary Report on Patentability Dated Jul. 9, 2020 From the International Bureau of WIPO Re. Application No. PCT/IL2018/051403. (14 Pages).
International Search Report and the Written Opinion Dated Sep. 2, 2019 From the International Searching Authority Re. Application No. PCT/IL2018/051403. (21 Pages).
International Search Report and the Written Opinion Dated May 6, 2019 From the International Searching Authority Re. Application No. PCT/IL2018/051401. (14 Pages).
Invitation to Pay Additional Fees, Communication Relating to the Result of the Partial International Search and the Provisional Opinion Dated Jul. 8, 2019 From the International Searching Authority Re. Application No. PCT/IL2018/051403. (14 Pages).
Decker et al. "Mechanistic Study of the Light-Induced Copolymerization of Maleimide/Vinyl Ether Systems", Macromolecular Chemistry and Physics, 201(13): 1493-1503, Aug. 2000.
Fan et al. "UV Curing of A Liquid Based Bismaleimide-Containing Polymer System", XPRESS Polymer Letters, 1(6): 397-405, 2007.
Jensen et al. "Inkjet-Printed Gold Nanoparticle Electrochemical Arrays on Plastic. Application to Immunodetection of A Cancer Biomarker Protein", Physical Chemistry Chemical Physics, 13(11): 4888-4894, Mar. 21, 2011.
Liu et al. "All-Polymer Capacitor Fabricated With Inkjet Printing Technique", Solid-State Electronics, 47(9): 1543-1548, Sep. 2003.
Zhang et al. "Inkjet Printing of Polyimide Insulators for the 3D Printing of Dielectric Materials for Microelectronic Applications", Journal of Applied Polymer Science, 133: 43361-1-43361-11, May 10, 2016.
Communication Pursuant to Article 94(3) EPC Dated May 2, 2022 From the European Patent Office Re. Application No. 18836916.9. (6 Pages).
Communication Pursuant to Article 94(3) EPC Dated Sep. 14, 2021 From the European Patent Office Re. Application No. 18836915.1. (6 Pages).
Communication Pursuant to Article 94(3) EPC Dated Jan. 20, 2023 From the European Patent Office Re. Application No. 18836915.1 (5 Pages).
Official Action Dated Jan. 24, 2023 from the US Patent and Trademark Office Re. U.S. Appl. No. 16/958,169. (27 pages).
Office Action Dated Sep. 28, 2023 From the Israel Patent Office Re. Application No. 275712. (6 Pages).
Communication Pursuant to Article 94(3) EPC Dated Aug. 17, 2023 From the European Patent Office Re. Application No. 18836915.1. (3 Pages).
Official Action Dated Jun. 29, 2023 from the US Patent and Trademark Office Re. U.S. Appl. No. 16/958,169. (16 pages).
Notice of Reasons for Rejection Dated Jul. 8, 2022 From the Japan Patent Office Re. Application No. 2020-536634 and Its Translation Into English. (19 Pages).
Communication Pursuant to Article 94(3) EPC Dated Apr. 25, 2024 From the European Patent Office Re. Application No. 18836916.9 (7 Pages).
Official Action Dated Jul. 2, 2024 from the US Patent and Trademark Office Re. U.S. Appl. No. 16/958,169. (17 pages).

* cited by examiner

FIG. 3A
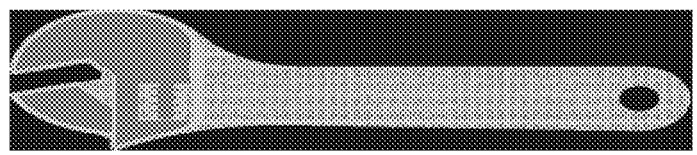
FIG. 3B
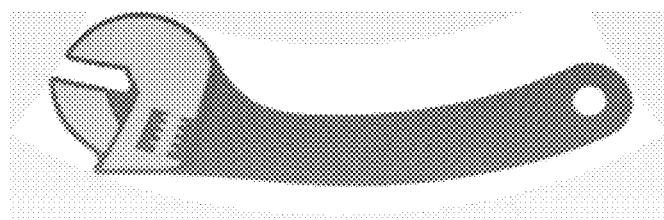
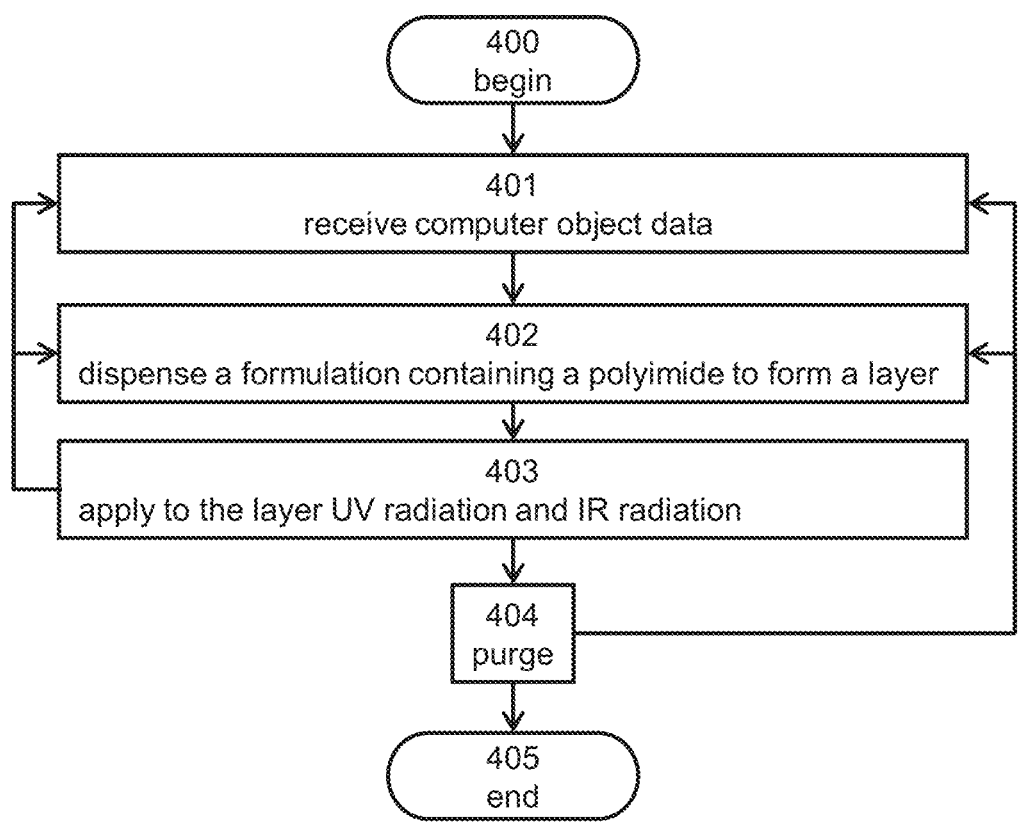
FIG. 4

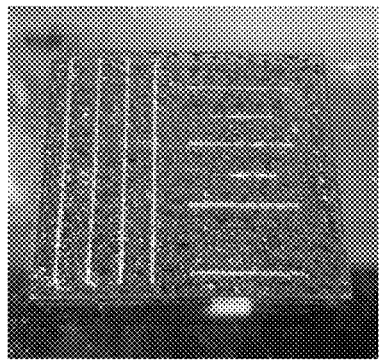 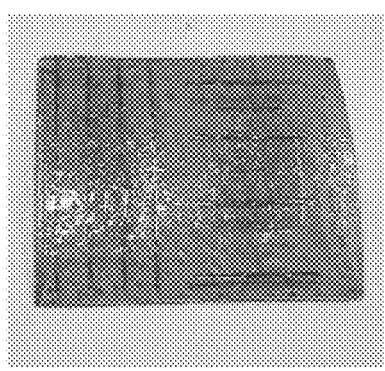 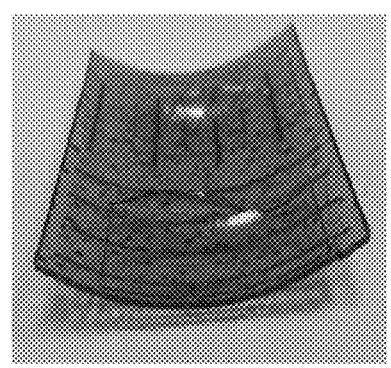
FIG. 15A  FIG. 15B  FIG. 15C
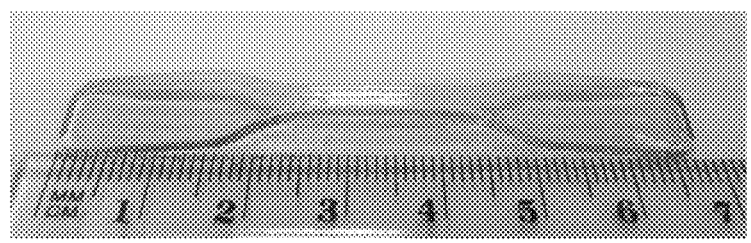
FIG. 16A
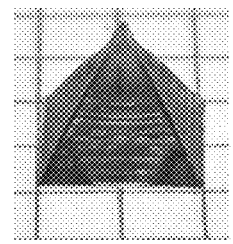
FIG. 16B

ADDITIVE MANUFACTURING EMPLOYING POLYIMIDE-CONTAINING FORMULATIONS

RELATED APPLICATIONS

This application is a National Phase of PCT Patent Application No. PCT/IL2018/051401 having International filing date of Dec. 27, 2018, which claims the benefit of priority under 35 USC § 119(e) of U.S. Provisional Patent Application No. 62/610,983 filed on Dec. 28, 2017.

PCT Patent Application No. PCT/IL2018/051401 is also related to U.S. Provisional Patent Application 62/610,984, filed on Dec. 28, 2017.

PCT Patent Application No. PCT/IL2018/051401 is also related to co-filed PCT Patent Application No. PCT/IL2018/051403 filed on Dec. 27, 2018 entitled "ADDITIVE MANUFACTURING EMPLOYING SOLVENT-FREE POLYIMIDE-CONTAINING FORMULATIONS".

The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to additive manufacturing using polyimide-containing formulations.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment which manufacture a three-dimensional structure in a layerwise manner.

Various AM technologies exist, amongst which are stereolithography, digital light processing (DLP), and three dimensional (3D) printing, 3D inkjet printing in particular. Such techniques are generally performed by layer by layer deposition and solidification of one or more building materials, typically photopolymerizable (photocurable) materials.

In three-dimensional printing processes, for example, a building material is dispensed from a printing head having a set of nozzles to deposit layers on a supporting structure. Depending on the building material, the layers may then solidify, harden or be cure, optionally using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

A printing system utilized in additive manufacturing may include a receiving medium and one or more printing heads. The receiving medium can be, for example, a fabrication tray that may include a horizontal surface to carry the material dispensed from the printing head. The printing head may be, for example, an ink jet head having a plurality of dispensing nozzles arranged in an array of one or more rows along the longitudinal axis of the printing head. The printing head may be located such that its longitudinal axis is substantially parallel to the indexing direction. The printing system may further include a controller, such as a microprocessor to control the printing process, including the movement of the printing head according to a pre-defined scanning plan (e.g., a CAD configuration converted to a Stereo Lithography (STL) format and programmed into the controller). The printing head may include a plurality of jetting nozzles. The jetting nozzles dispense material onto the receiving medium to create the layers representing cross sections of a 3D object.

In addition to the printing head, there may be a source of curing energy, for curing the dispensed building material. The curing energy is typically radiation, for example, UV radiation.

Additionally, the printing system may include a leveling device for leveling and/or establishing the height of each layer after deposition and at least partial solidification, prior to the deposition of a subsequent layer.

The building materials may include modeling materials and support materials, which form the object and the temporary support constructions supporting the object as it is being built, respectively.

The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently harden or solidify, typically upon exposure to curing energy (e.g., UV curing), to form the required layer shape. After printing completion, support structures are removed to reveal the final shape of the fabricated 3D object.

Several additive manufacturing processes allow additive formation of objects using more than one modeling material, also referred to as "multi-material" AM processes. For example, U.S. patent application having Publication No. 2010/0191360, of the present Assignee, discloses a system which comprises a solid freeform fabrication apparatus having a plurality of printing heads, a building material supply apparatus configured to supply a plurality of building materials to the fabrication apparatus, and a control unit configured for controlling the fabrication and supply apparatus. The system has several operation modes. In one mode, all printing heads operate during a single building scan cycle of the fabrication apparatus. In another mode, one or more of the printing heads is not operative during a single building scan cycle or part thereof.

In a 3D inkjet printing process such as Polyjet™ (Stratasys Ltd., Israel), the building material is selectively jetted from one or more printing heads and deposited onto a fabrication tray in consecutive layers according to a predetermined configuration as defined by a software file.

U.S. Pat. No. 9,227,365, by the present assignee, discloses methods and systems for solid freeform fabrication of shelled objects, constructed from a plurality of layers and a layered core constituting core regions and a layered shell constituting envelope regions.

The Polyjet™ technology allows control over the position and composition of each voxel (volume pixel), which affords enormous design versatility and digital programming of multi-material structures. Other advantages of the Polyjet™ technology is the very high printing resolution, up to 14 μm layer height, and the ability to print multiple materials simultaneously, in a single object. This multi-material 3D printing process often serves for fabrication of complex parts and structures that are comprised of elements having different stiffness, performance, color or transparency. New ranges of materials, programmed at the voxel level, can be created by the PolyJet™ printing process, using only few starting materials.

In order to be compatible with most of the commercially-available printing heads utilized in a 3D inkjet printing system, the uncured building material should feature the following characteristics: a relatively low viscosity (e.g., Brookfield Viscosity of up to 50 cps, or up to 35 cps, preferably from 8 to 25 cps) at the working (e.g., jetting) temperature; Surface tension of from about 25 to about 55 dyn/cm, preferably from about 25 to about 40 dyn/cm; and a Newtonian liquid behavior and high reactivity to a selected curing condition, to enable fast solidification of the jetted layer upon exposure to a curing condition, of no more than 1 minute, preferably no more than 20 seconds. Additional requirements include low boiling point solvents (if solvents are used), e.g., featuring bp lower than 200 or lower than 190° C., yet characterized preferably by low evaporation rate at the working (e.g., jetting) temperature, and, if the building material includes solid particles, these should feature an average size of no more than 2 microns.

Current PolyJet™ technology offers the capability to use a range of curable (e.g., polymerizable) materials that provide polymeric materials featuring a variety of properties, ranging, for example, from stiff and hard materials (e.g., curable formulations marketed as the Vero™ Family materials) to soft and flexible materials (e.g., curable formulations marketed as the Tango™ and Agilus™ families), and including also objects made using Digital ABS, which contain a multi-material made of two starting materials (e.g., RGD515 & RGD535/531), and simulate properties of engineering plastic. Most of the currently practiced PolyJet materials are curable materials, which harden or solidify upon exposure to radiation, mostly UV radiation and/or heat.

In order to expand 3D printing and make it more versatile, new processes should be developed to enable deposition of a broader range of materials, including engineering polymers with various characteristics. Engineering polymers are materials with superior thermal stability and mechanical properties that make them valuable in the manufacturing of structural elements.

Polyimides are very promising materials for additive manufacturing such as 3D inkjet printing, as these materials feature desirable characteristics such as high thermal stability, excellent mechanical properties, wear resistance, radiation resistance, inertness to solvents, low dielectric constant, and good adhesion strengths. Some polyimides are thermoplastic and some are thermosetting polymer. The properties of the polyimide can be determined by the chemical structure of the monomeric precursor and/or the polymerization mechanism, with an endless number of polymeric precursors and an enormous range of applications of the resulting polyimides.

However, the use of polyimides in additive manufacturing, and in 3D inkjet printing methodologies in particular, is limited mostly by the relatively long time that is required for these materials to solidify (cure). See, for example, F. Zhang et al., in J. Applied Polymer Science, 2016, 133, 43361. A further limitation lies in the properties of the polyimide obtained by these processes. Thus, for example, Ultem, a thermoplastic polyetherimide, which is currently used in 3D printing by FDM (Fused Deposition Modeling) technology, was shown to feature properties, which are inferior to the corresponding neat polyimide (see, for example, www(dot)stratasys(dot)com/materials/fdm/ultem-9085. Polyimide films formed by inkjet printing by jetting polyamic solutions following by thermal imidization were reported in Liu et al. Solid State Electron. 2003, 47, 1543; and Jensen et al., J. F. Phys. Chem. Chem. Phys. 2011, 13, 4888. F. Zhang et al., in J. Applied Polymer Science, 2016, 133, 43361, reported that 3D insulators were printed using the same approach of polyamic acid condensation, however the Z-dimension of these structures was below 1 μm.

PCT/IB2017/054054, filed Jul. 5, 2017, describes solutions containing a bismaleimide (BMI) as a chemical precursor of a polyimide, in a suitable solvent, optionally along with a polymerization initiator (e.g., photoinitiator), a surfactant, a stabilizer, a reinforcer, or any other additive.

EP Patent No. 1857478B1, which is incorporated by reference as if fully set forth herein, describes a curable formulation for inkjet printing, which comprises a bis-allyl-nadi-imide compound as defined by Formula I therein, a bismaleimide as defined by Formula II therein, and a diluent which comprises a polymerizable material and optionally an organic solvent.

Additional background art includes WO2016/151586, by the present assignee, which describes using polyimides within a sintering inducing formulation, in additive manufacturing that utilizes a catalytic ink.

SUMMARY OF THE INVENTION

According to an aspect of some embodiments of the invention the present invention there is provided a method of additive manufacturing of a three-dimensional object, the method comprises: dispensing from a first array of nozzles a modeling material formulation containing a polyimide precursor to form a layer in a configured pattern corresponding to a shape of a slice of the object; applying to the layer ultraviolet radiation and infrared radiation from two different radiation sources; and repeating the dispensing and the application of radiation to form a plurality of layers in configured patterns corresponding to shapes of other slices of the object.

According to an aspect of some embodiments of the present invention there is provided a computer software product, which comprises a computer-readable medium in which program instructions are stored, which instructions, when read by a computerized controller of an additive manufacturing system, cause the system to execute the method as delineated above and optionally and preferably as further detailed below.

According to an aspect of some embodiments of the present invention there is provided a system for fabricating a three-dimensional object by additive manufacturing, the system comprises: two or more arrays of nozzles, having at least a first array of nozzles configured for dispensing a modeling material containing a polyimide precursor, and a second array of nozzles configured for dispensing a support material; and a controller having a circuit configured to execute the method as delineated above and optionally and preferably as further detailed below.

According to some of any of the embodiments of the invention, the first array of nozzles and the second array of nozzles are both located in the same printing head.

According to some of any of the embodiments of the invention the first and the second arrays of nozzles are located in separate printing heads, wherein the first array of nozzles is located in a first printing head, and the second array of nozzles is located in a second printing head.

According to some of any of the embodiments of the invention, the infrared radiation is applied by performing a single scan of the infrared radiation over the layer.

According to some of any of the embodiments of the invention, the infrared radiation is applied by performing a plurality of scans of the infrared radiation over the layer.

According to some of any of the embodiments of the invention, the infrared radiation is applied by performing at least four scans, more preferably from about four scans to about eight scans, of the infrared radiation over the layer.

According to some of any of the embodiments of the invention the infrared radiation is applied at a power of at least 750 watts, more preferably at least 850 watts, e.g., about 1000 watts.

According to some of any of the embodiments of the invention, the infrared radiation is applied by two infrared light sources.

According to some of any of the embodiments of the invention, the dispensing from the first array of nozzles is by applying voltage pulses to the first array of nozzles, the voltage pulses being characterized by a pulse width of from about 6.0 μs to about 6.4 μs, more preferably from about 6.1 μs to about 6.3 μs.

According to some of any of the embodiments of the invention a viscosity of the material formulation, containing the polyimide precursor is from about 12 cP to about 18 cP.

According to some of any of the embodiments of the invention, the dispensing is executed to dispense the material formulation containing the polyimide precursor in droplets having a weight of from about 50 ng to about 90 ng.

According to some of any of the embodiments of the invention, the dispensing comprises applying voltage at a frequency of from about 15 kHz to about 25 kHz to the first array of nozzles dispensing the material formulation containing the polyimide precursor.

According to some of any of the embodiments of the invention, the polyimide precursor is bismaleimide.

According to some of any of the embodiments of the invention, the polyimide precursor has a molecular weight of from 200 to 2000 Daltons.

According to some of any of the embodiments of the invention, the polyimide precursor the polyimide precursor is represented by Formula I:

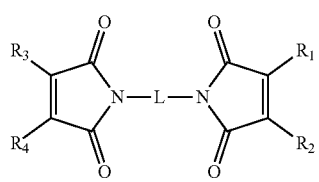

Formula I wherein: L is a linking moiety; and $R_1$-$R_4$ are each independently selected from hydrogen, alkyl and cycloalkyl.

According to some of any of the embodiments of the invention $R_1$-$R_4$ are each hydrogen.

According to some of any of the embodiments of the invention, the linking moiety L is or comprises a hydrocarbon.

According to some of any of the embodiments of the invention, the hydrocarbon comprises two or more alkylene chains that are connected therebetween via a branching unit.

According to some of any of the embodiments of the invention, the branching unit comprises or consists of a cycloalkyl.

According to some of any of the embodiments of the invention the formulation, containing the polyimide precursor further comprises an organic solvent.

According to some of any of the embodiments of the invention, the organic solvent is a polar organic solvent.

According to some of any of the embodiments of the invention, the organic solvent has a boiling temperature lower than 190° C. and/or an evaporation rate lower than 1, or lower than 0.5.

According to some of any of the embodiments of the invention, a weight ratio of the polyimide and the organic solvent in the formulation ranges from 50:50 to 90:10.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A and 3B are schematic illustrations demonstrating coordinate transformations according to some embodiments of the present invention;

FIG. 4 is a flowchart diagram of a method suitable for AM of a three-dimensional object according to various exemplary embodiments of the present invention;

FIGS. 15A-C are images showing printed three-dimensional objects with conductive lines, as obtained in experiments performed according to some embodiments of the present invention;

FIGS. 16A and 16B are images of a 69×11×1.5 mm micro-tensile dog bone (FIG. 16A), and a 10×10×10 mm pyramid (FIG. 16B), as obtained in experiments performed according to some embodiments of the present invention;

DESCRIPTION OF SPECIFIC EMBODIMENTS OF THE INVENTION

Figure 1A:
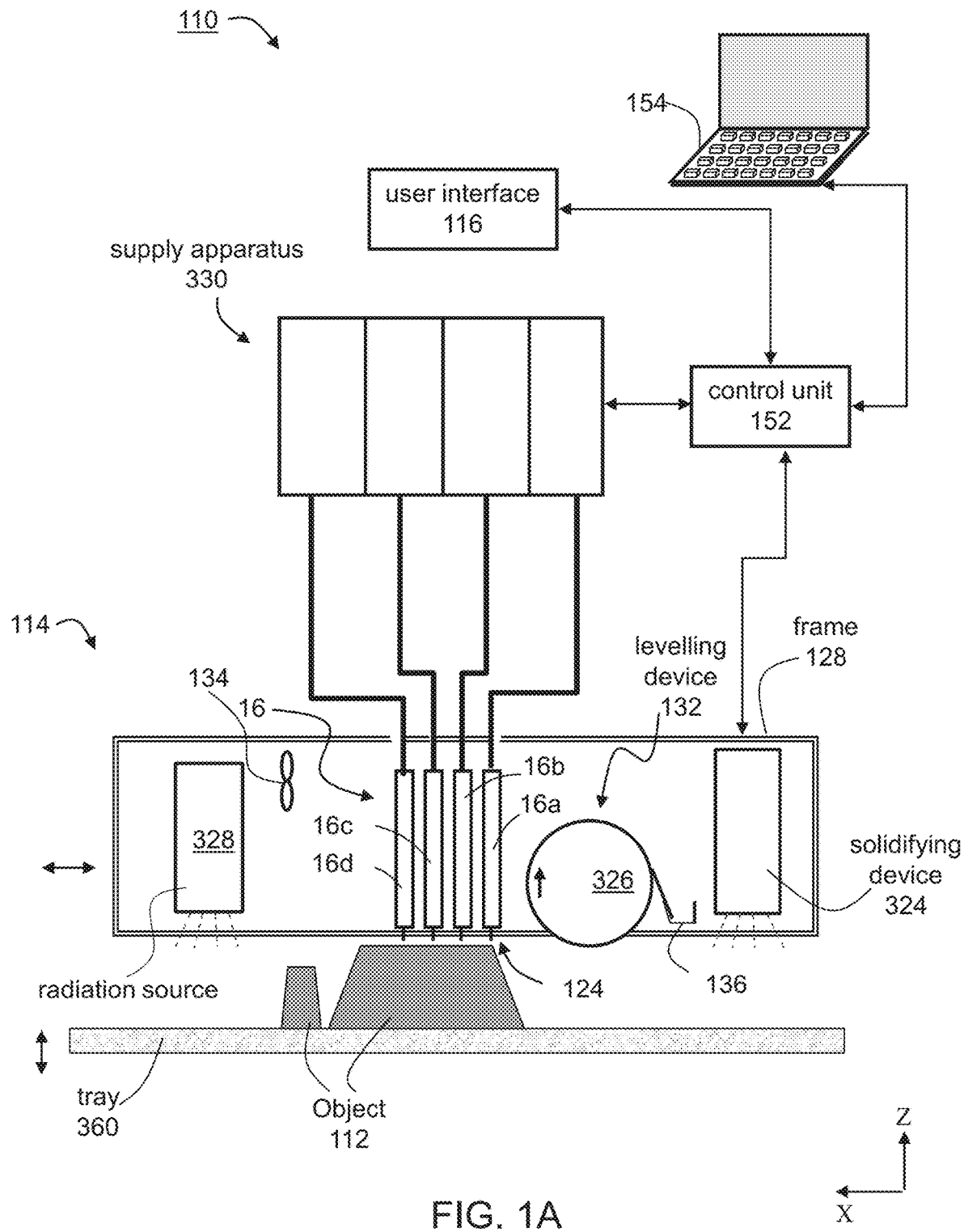
FIGS. 1A-D are schematic illustrations of an additive manufacturing system according to some embodiments of the invention.

The present invention, in some embodiments thereof, relates to additive manufacturing and, more particularly, but not exclusively, to additive manufacturing using polyimide-containing formulations.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Herein throughout, the term "object" describes a final product of the additive manufacturing. This term refers to the product obtained by a method as described herein, after removal of the support material, if such has been used as part of the building material. The "object" therefore essentially consists (at least 95 weight percents) of a hardened (e.g., cured) modeling material.

The term "object" as used herein throughout refers to a whole object or a part thereof.

Each layer is formed by additive manufacturing apparatus, which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention, the AM comprises three-dimensional printing, more preferably three-dimensional inkjet printing. In these embodiments, a building material formulation is dispensed from a printing head having one or more arrays of nozzles to deposit building material formulation in layers on a supporting structure. The AM apparatus thus dispenses building material formulation in target locations, which are to be occupied and leaves other target locations void. The apparatus typically includes a plurality of arrays of nozzles, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention, an object is manufactured by dispensing two or more different modeling material formulations, each material formulation from a different array of nozzles of the AM apparatus. In some embodiments, two or more such arrays of nozzles that dispense different modeling material formulations are both located in the same printing head of the AM apparatus. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are both located in separate the same printing head.

The material formulations are optionally and preferably deposited in layers during the same pass of the respective printing head(s). The material formulations and combination of material formulations within the layer are selected according to the desired properties of the object.

Figure 2A:
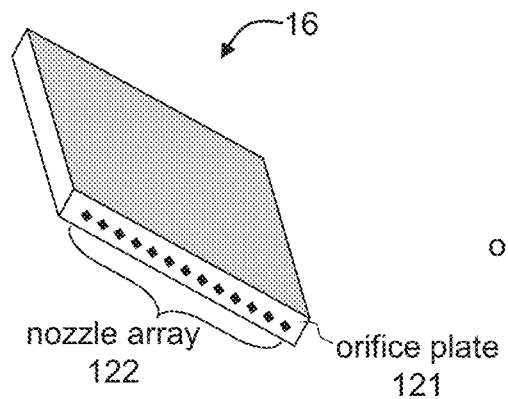
FIGS. 2A-2C are schematic illustrations of printing heads according to some embodiments of the present invention.
Figure 2B:
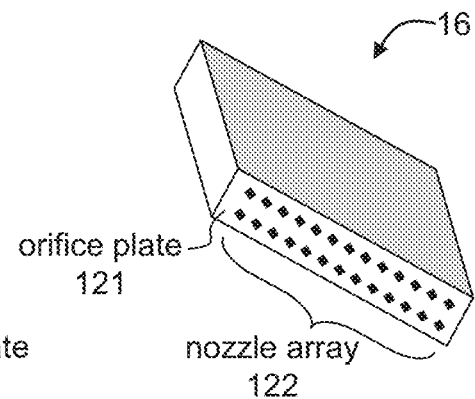
Figure 2C:
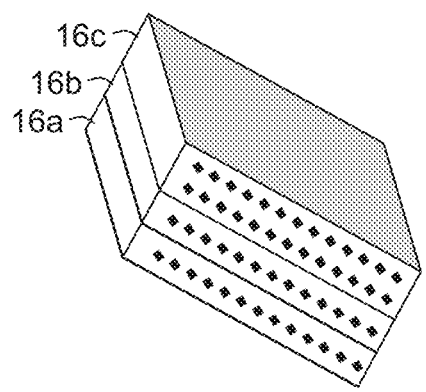

A representative and non-limiting example of a system 110 suitable for AM of an object 112 according to some embodiments of the present invention is illustrated in FIG. 1A. System 110 comprises an additive manufacturing apparatus 114 having a dispensing unit 16, which comprises a plurality of printing heads. Each head preferably comprises one or more arrays of nozzles 122, typically mounted on an orifice plate 121, as illustrated in FIGS. 2A-C described below, through which a liquid (uncured) building material formulation 124 is dispensed.

The diameter of each nozzle can be of any internal diameter suitable for three-dimensional inkjet printing. A typical range of the diameters is from about 15 μm to about 30 μm. For example, a printing head known as E1 by Ricoh Printing Systems America, Inc. has a nozzle internal diameter of about 26 μm, and a printing head known as GEN4L by Ricoh Printing Systems America, Inc. has a nozzle internal diameter of about 20 μm. Any of these printing head can be used in apparatus 114. Other printing heads are also contemplated. Preferably, but not necessarily, the orifice plate 121 of the printing head is coated by anti-wetting coating. The GEN4L printing head is known to include such a coating and is therefore advantageous over the E1 printing head.

The term "printing head" as used herein represents a dispensing head usable in 3D printing such as 3D inkjet printing.

Preferably, but not obligatorily, apparatus 114 is a three-dimensional inkjet printing apparatus, in which case the printing heads are inkjet printing heads, and the building material formulation is dispensed via inkjet technology. This need not necessarily be the case, since, for some applications, it may not be necessary for the additive manufacturing apparatus to employ three-dimensional inkjet printing techniques. Representative examples of additive manufacturing apparatus contemplated according to various exemplary embodiments of the present invention include, without limitation, fused deposition modeling apparatus and fused material formulation deposition apparatus.

Each printing head is optionally and preferably fed via one or more building material formulation reservoirs which may optionally include a temperature control unit (e.g., a temperature sensor and/or a heating device), and a material formulation level sensor. To dispense the building material formulation, a voltage signal is applied to the printing heads to selectively deposit droplets of material formulation via the printing head nozzles, for example, as in piezoelectric inkjet printing technology. The dispensing rate of each head depends on the number of nozzles, the type of nozzles and the applied voltage signal rate (frequency). Such printing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four printing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense a first modeling material formulation, head 16b can dispense a second modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material formulation printing heads (modeling heads) and the number of support material formulation printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein throughout the term "about" refers to ±10%.

For example, for a=1, the overall dispensing rate of support material formulation is generally the same as the overall dispensing rate of the modeling material formulation when all the arrays of nozzles operate.

For example, apparatus 114 can comprise M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to hardened. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

In addition to solidifying device 324, apparatus 114 optionally and preferably comprises an additional radiation source 328 for solvent evaporation. Radiation source 328 optionally and preferably generates infrared radiation. In various exemplary embodiments of the invention solidifying device 324 comprises a radiation source generating ultraviolet radiation, and radiation source 328 generates infrared radiation.

In some embodiments of the present invention apparatus 114 comprises cooling system 134 such as one or more fans or the like.

The printing head(s) and radiation source are preferably mounted in a frame or block 128, which is preferably operative to reciprocally move over a tray 360, which serves as the working surface. In some embodiments of the present invention the radiation sources are mounted in the block such that they follow in the wake of the printing heads to at least partially cure or solidify the material formulations just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the printing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the printing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the printing heads, the layer thus formed may be straightened by leveling device 326, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

System 110 optionally and preferably comprises a building material formulation supply system 330, which comprises the building material formulation containers or cartridges and supplies a plurality of building material formulations to fabrication apparatus 114.

A control unit 152 controls fabrication apparatus 114 and optionally and preferably also supply system 330. Control unit 152 typically includes an electronic circuit configured to perform the controlling operations. Control unit 152 preferably communicates with a data processor 154, which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each printing head or each nozzle array and the temperature of the building material formulation in the respective printing head or respective nozzle array.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
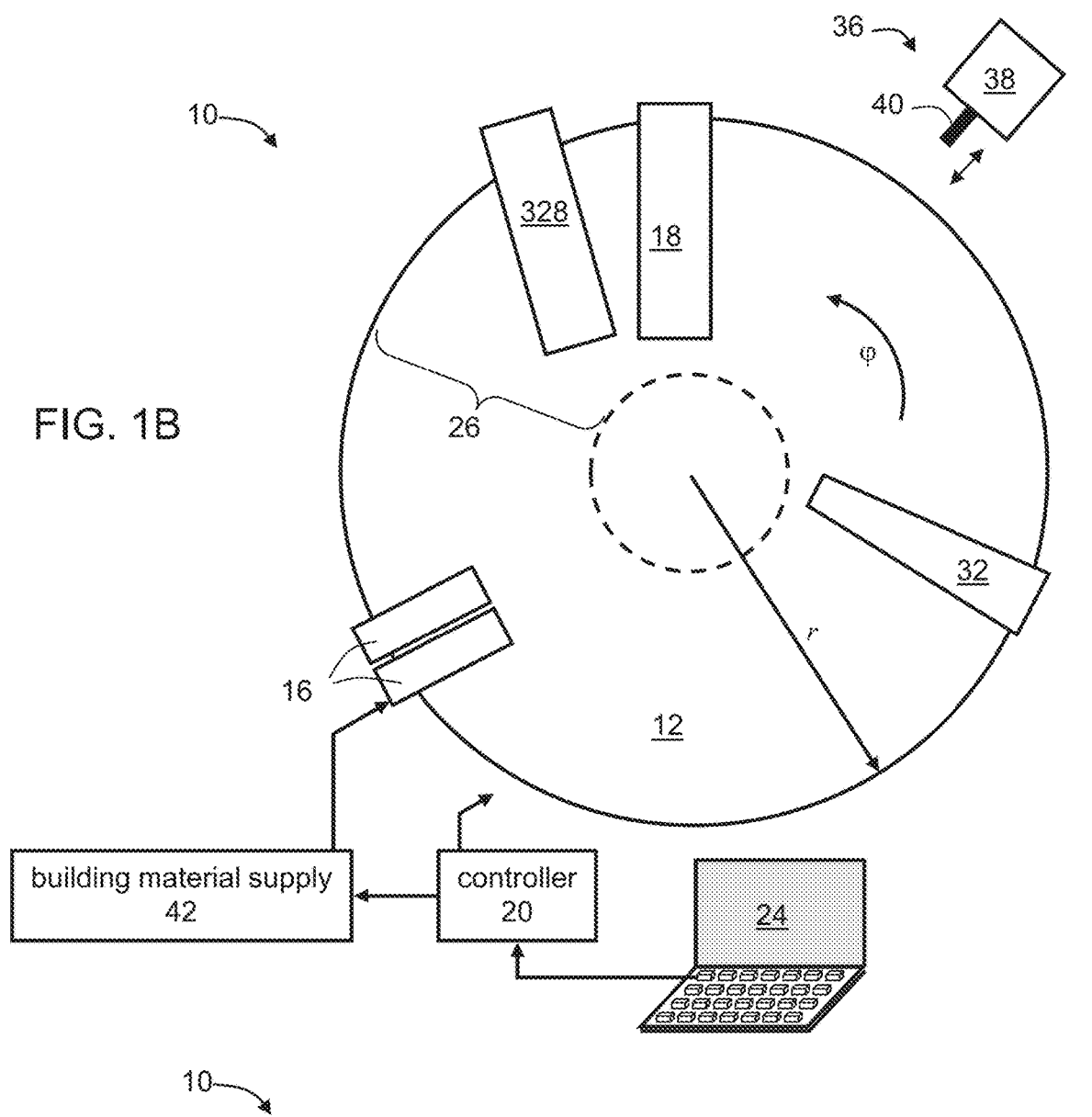
Figure 1C:
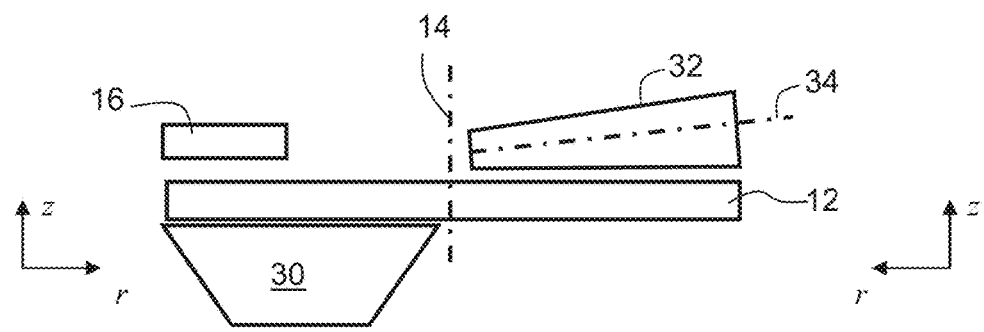
Figure 1D:
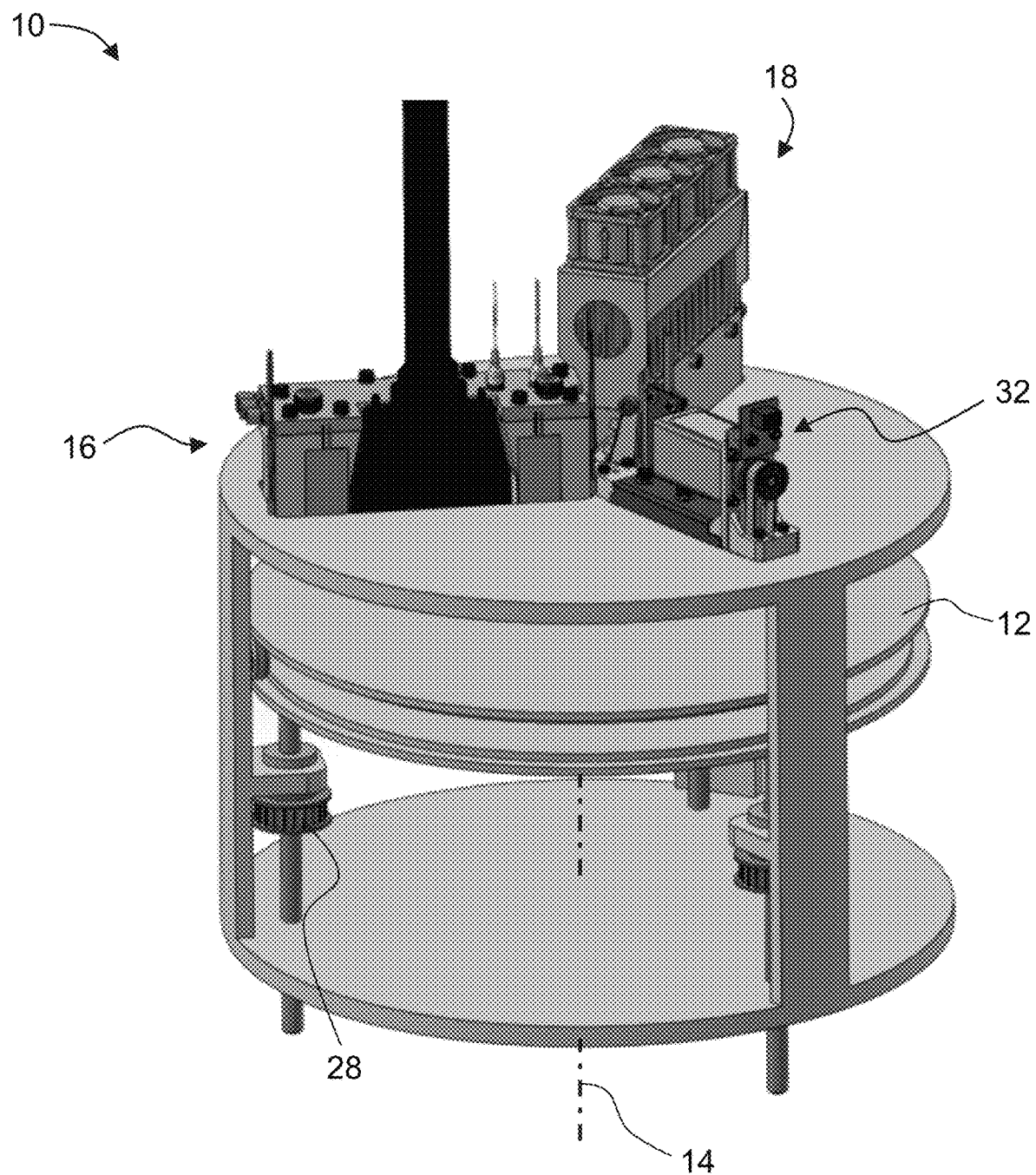

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. Tray 12 can have a shape of a disk or it can be annular. Non-round shapes are also contemplated, provided they can be rotated about a vertical axis. Printing heads 16 can be any of the printing heads described above with respect to system 110.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises a solidifying device 18 which can include one or more radiation sources, such as, but not limited to, an ultraviolet radiation source, visible radiation source or infrared radiation source, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20, which may activate and deactivate radiation source 18 and may optionally also control the amount of radiation generated by radiation source 18.

In addition to solidifying device 18, system 10 optionally and preferably comprises an additional radiation 328, as further detailed hereinabove. In various exemplary embodiments of the invention solidifying device 18 comprises a radiation source generating ultraviolet radiation, and radiation source 328 generates infrared radiation.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different arrays of nozzles (belonging to the same or different printing head). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Pat. No. 9,031,680, the contents of which are hereby incorporated by reference.

FIG. 4 is a flowchart diagram of a method suitable for AM of a three-dimensional object according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be executed by an AM system (e.g., system 110 or system 10) operated by a controller (e.g., controller 152 or 20). The method begins at 400 and optionally and preferably proceeds to 401 at which at which computer object data that collectively pertain to a three-dimensional shape of the object are received. The data can be received by a data processor (e.g., processor 154 or 24) operatively associated with the AM system. For example, the data processor can access a computer-readable storage medium (not shown) and retrieve the data from the medium. The data processor can also generate the data, or a portion thereof, instead of, or in addition to, retrieving data from the storage medium, for example, by means of a computer aided design (CAD) or computer aided manufacturing (CAM) software. The computer object data typically include a plurality of slice data each defining a layer of the object to be manufactured. The data processor can transfer the data, or a portion thereof, to the controller of the AM system. Typically, but not necessarily, the controller receives the data on a slice-by-slice basis.

The data can be in any data format known in the art, including, any of the aforementioned computer object data formats.

The method proceeds to 402 at which a modeling material formulation containing a curable material which is a polyimide precursor that forms, upon exposure to a curing condition, a polyimide is dispensed to form a layer in a configured pattern corresponding to a shape of a slice of the object. The modeling material formulation containing the polyimide precursor can be any of the polyimide precursor-containing formulations described herein. Alternatively other material formulations containing polyimide precursors can be used. Preferably, the viscosity of the polyimide precursor-containing formulation while being dispensed is from about 12 cP to about 18 cP, e.g., about 15 cP. The dispensing 402 is preferably at a temperature of from about 65° C. to about 75° C. or from about 66° C. to about 72° C.

The dispensing 402 is optionally and preferably executed to dispense the polyimide precursor-containing material formulation in droplets having an average weight of from about 50 ng to about 90 ng or from about 65 ng to about 85 ng. These embodiments are particularly useful when the dispensing 402 is by a printing head having a nozzle internal diameter of from about 24 µm to about 28 µm (e.g., the aforementioned E1 printing head). Alternatively, the average droplets' weight can be from about 28 ng to about 38 ng or from about 30 ng to about 34 ng, e.g., about 32 ng. These embodiments are particularly useful when the dispensing 402 is by a printing head having a nozzle diameter of from about 18 µm to about 23 µm (e.g., the aforementioned GEN4L printing head). These weights can be achieved by applying a voltage of from about 23 V to about 30 V to the printing head.

The printing heads are optionally and preferably activated by pulses of alternating voltage. In some embodiments of the present invention the dispensing comprises applying voltage at a frequency of from about 15 kHz to about 25 kHz or from 16 kHz to about 20 kHz, e.g., about 18 kHz to the printing head. These embodiments are particularly useful when the dispensing 402 is by a printing head having a nozzle internal diameter of from about 24 µm to about 28 µm (e.g., the aforementioned E1 printing head). Alternatively, the applied voltage can be at a frequency of from about 35 kHz to about 45 kHz or from 36 kHz to about 40 kHz, e.g., about 38 kHz. These embodiments are particularly useful when the dispensing 402 is by a printing head having a nozzle diameter of from about 18 µm to about 23 µm (e.g., the aforementioned GEN4L printing head). The pulse width of the pulsed voltage can be from about 5 µs to about 10 µs or from about 6 µs to about 9 µs or from about 6 µs to about 6.4 µs or from about 6.1 µs to about 6.3 µs, e.g., about 6.2 µs or about 8 µs.

In some embodiments of the present invention the dispensing of the polyimide precursor-containing formulation is executed in cycles, each having an active period during which the polyimide precursor-containing formulation is intermittently dispensed, and an idle period during which the polyimide precursor-containing formulation is not dispensed.

The durations of the active period and the idle period typically vary depending on the printing head that is being used and may also depend on the formulation. For example, in experiments performed by the inventors it was found that when the dispensed formulation is a polyimide precursor-containing modeling formulation comprising a bismaleimide and a solvent as described herein at 80:20 weight ratio, then one possible duration of the active time for an E1 printing head is less than 5 minutes, e.g., from about 1 to about 4.5 minutes, and the preferred duration of the active time for a GEN4L printing head is more than 15 minutes, e.g., from about 15 to about 25 minutes, with optional idle period of 15 minutes or more. For prolonged idle time-periods (for example at least 15 or at least 20 minutes), a purging and/or wiping operation is optionally and preferably executed before recommencing the dispensing of the polyimide precursor-containing modeling formulation.

At 403 ultraviolet radiation and infrared radiation are applied to the newly formed layer, preferably using two different radiation sources (e.g., sources 324 and 328 or sources 18 and 328). The ultraviolet radiation serves for curing polyimide precursor-containing formulation and the infrared radiation serves for removing solvent from the layer. The infrared radiation can have either a broad or a narrow wavelength spectrum, in any of the near, short, mid, long or far infrared ranges, and is typically generated by one or more ceramic and/or halogen lamps. It was found by the present inventors that removal of solvent by directly irradiating the newly formed layer is advantageous and enhances the quality of the fabricated object. Specifically, the present inventors found that a direct irradiation of the newly formed layer by infrared radiation can reduce the roughness of the object's surface, and also reduces a curling effect, since it reduces or eliminates the amount of trapped solvent between the layers and therefore reduces formation of internal stresses.

While the infrared radiation dose that is delivered to the layer depends on the amount of solvent in the formulation, and also on the conditions within the AM fabrication chamber, the infrared radiation preferably scans the layer at least once, and in some embodiments a plurality of times, before dispensing a subsequent layer.

In some embodiments of the invention the cooling system is switched off during the formation of a layer from the polyimide precursor-containing formulation. It was found by the inventors that this further reduces the risk of curling since the solidification of the polyimide precursor-containing formulation is typically accompanied by relatively high shrinkage.

In some embodiments of the present invention the method proceeds to 404 at which a purging operation is executed. The purging operation typically includes dispensing remnants of the formulation out of the printing heads at a dedicated location on the tray that is laterally displaced from the location at which the object is being built. The purging operation can optionally and preferably be accompanied by a wiping operation in which the orifice plate 121 of the printing head is wiped, for example, by a wiper blade or a squeegee (not shown). The time-period between successive purging operations typically varies depending on the printing head that is being used and may also depend on the formulation. For example, in experiments performed by the inventors it was found that when the dispensed formulation is a polyimide precursor-containing modeling formulation comprising a bismaleimide and a solvent as described herein at 80:20 weight ratio, then the preferred time-period between successive purging operations for an E1 printing head is from about 3 minutes to about 5 minutes, e.g., about 4 minutes, and the preferred time-period between successive purging operations for a GEN4L printing head is from about 14 minutes to about 61 minutes.

From operation 403 or operation 404 (when executed) the method optionally and preferably loops back to 401 to receive data for another slice. When the data for the next slice is already stored within the controller, the method can loop back to 402 for form the next layer. Once an object formed of a plurality of layers is fabricated, the method ends at 405.

Optionally and preferably, the method further comprises dispensing a building material that comprises a support formulation, and, further optionally and preferably, the method further comprises removing the support material once it cures or solidifies.

An object according to some embodiments of the present invention is such that at least a part or a portion thereof comprises a polyimide, as defined herein. The object may be such that several parts or portions thereof are made of a polyimide material, or such that is entirely made of a polyimide material. The polyimide material can be the same or different in the different parts or portions, and, for each part, portion or the entire object made of a polyimide material, the polyimide material can be the same or different within the portion, part or object. When different polyimide materials are used, they can differ in their chemical composition and/or mechanical properties.

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "cured modeling material" or "hardened modeling material" describes the part of the building material that forms the object, as defined herein, upon exposing the dispensed building material to curing, and, optionally, if a support material has been dispensed, also upon removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the building material which is dispensed so as to form the object, as described herein. The modeling material formulation is an uncured modeling formulation (unless specifically indicated otherwise), which, upon exposure to a curing condition (e.g., curing energy), forms the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling formulations, and can be dispensed such that different parts of the object are made, upon curing, of different cured modeling formulations or different combinations thereof, and hence are made of different cured modeling materials or different mixtures of cured modeling materials.

The formulations forming the building material (modeling material formulations and support material formulations) comprise one or more curable materials, which, when exposed to a curing condition (e.g., curing energy), form hardened (cured) material.

Herein throughout, a "curable material" is a compound (typically a monomeric or oligomeric compound, yet optionally a polymeric material) which, when exposed to a curing condition (e.g., curing energy), as described herein, solidifies or hardens to form a cured material. Curable materials are typically polymerizable materials, which undergo polymerization and/or cross-linking when exposed to a suitable curing condition (e.g., a suitable energy source).

A curable material, according to the present embodiments, also encompasses materials which harden or solidify (cure) without being exposed to a curing energy, but rather to a curing condition (for example, upon exposure to a chemical reagent), or simply upon exposure to the environment.

The terms "curable" and "solidifyable" as used herein are interchangeable.

The polymerization can be, for example, free-radical polymerization, cationic polymerization or anionic polymerization, and each can be induced when exposed to curing energy such as, for example, radiation, heat, etc., as described herein.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a short-chain polymer, each being polymerizable and/or cross-linkable as described herein.

In some of any of the embodiments described herein, when a curable material is exposed to a curing condition (e.g., radiation), it hardens (cured) by any one, or combination, of chain elongation and cross-linking.

In some of any of the embodiments described herein, a curable material is a monomer or a mixture of monomers, which can form a polymeric material upon a polymerization reaction, when exposed to curing energy at which the polymerization reaction occurs. Such curable materials are also referred to herein as monomeric curable materials.

In some of any of the embodiments described herein, a curable material is an oligomer or a mixture of oligomers, which can form a polymeric material upon a polymerization reaction, when exposed to curing energy at which the polymerization reaction occurs. Such curable materials are also referred to herein as oligomeric curable materials.

In some of any of the embodiments described herein, a curable material is a polymer or a mixture of polymers which can form a polymeric or co-polymeric material upon a polymerization reaction, by chain extension or addition, or which cross-link, or is cross-linked by, other curable materials, when exposed to curing energy at which the polymerization reaction occurs. Such curable materials are also referred to herein as polymeric curable materials.

In some of any of the embodiments described herein, a curable material, whether monomeric or oligomeric or polymeric, can be a mono-functional curable material or a multi-functional curable material.

Herein, a mono-functional curable material comprises one functional group that can undergo polymerization when exposed to curing energy (e.g., radiation).

A multi-functional curable material comprises two or more, e.g., 2, 3, 4 or more, functional groups that can undergo polymerization when exposed to curing energy. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to curing energy and/or act as cross-linkers.

In some exemplary embodiments of the invention an object is manufactured by dispensing a building material (uncured) that comprises two or more different modeling material formulations, each modeling material formulation from a different array of nozzles (belonging to the same or different printing heads) of the inkjet printing apparatus. The modeling material formulations are optionally and preferably deposited in layers during the same pass of the printing heads. The modeling material formulations and/or combination of formulations within the layer are selected according to the desired properties of the object, and as further described in detail hereinbelow.

The phrase "digital materials", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

According to embodiments of the present invention, the dispensed building material comprises at least one modeling material that contains a curable material which, upon exposure to a curing condition, forms a polyimide. Such a curable material is also referred to herein as "a polyimide precursor" and the modeling formulation that comprises such a curable material is referred to herein as a polyimide precursor-containing formulation.

Polyimide precursors typically include one or more imide moieties and one or more polymerizable moieties.

An imide moiety is a group that consists of two acyl groups bound to a nitrogen atom, —C(=O)—NRa—C(=O)—, wherein Ra can be, for example, hydrogen, alkyl, cycloalkyl, aryl, alkaryl, and any other substituent as defined herein for other chemical groups.

According to some embodiments of the present invention, polyimide precursors that are usable in the context of the present embodiments include α,ω-bismaleimides (BMIs).

BMIs are precursors of polyimides that are used for preparation of thermosetting materials.

α,ω-Bismaleimides feature two imide moieties which are linked to one another via a linking moiety and which further feature polymerizable moieties that undergo homopolymerization and/or copolymerization when exposed to UV irradiation, thermal energy and/or chemical catalysis, to thereby provide a cross-linked polyimide, as depicted in Scheme 1 below.

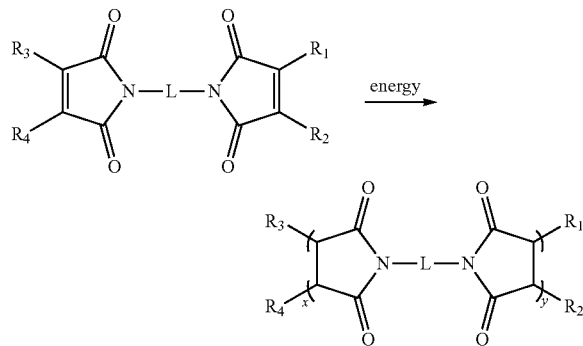

Scheme 1

The double bond of the maleimide end-group is highly electron deficient due to the adjacent electron-withdrawing acyl groups. Hence, low molecular weight bismaleimide precursors can undergo homo- and/or copolymerization at the carbon-carbon double bond to provide a crosslinked network.

Additionally, the unsaturated alkenyl group is a very reactive dienophile and, therefore, can undergo addition reactions such as Michael addition of amines (e.g., polyamines) and Diels-Adler addition of dienes.

The obtained polyimide materials are thermosetting materials that are characterized by relative ease of processing and the ability to tailor specific rheological properties by controlling the molecular weight and possibly the chemical composition of the linking moiety. Additionally, the obtained polyimides have excellent retention of physical properties at high temperatures, in wet environments and in the presence of solvents and lubricating fluids.

α,ω-Bismaleimides usable in the context of the present embodiments can be collectively represented by Formula I:

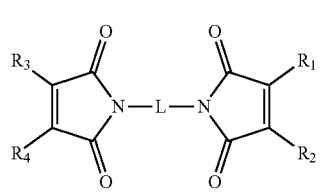

Formula I wherein:

L is a linking moiety which can be, or comprise, an alkyl, an aryl, a cycloalkyl, a hydrocarbon, as these terms are defined herein, or, alternatively, a heteroalicyclic, a heteroaryl, a poly(alkylene chain) and any combination of the foregoing; and $R_1$-$R_4$ are each independently selected from hydrogen, alkyl, cycloalkyl and optionally any other substituent as described herein.

Preferably, $R_1$-$R_4$ are each hydrogen.

The chemical composition and molecular weight of the linking moiety L determine the properties of the obtained polyimide.

In some embodiments, the L linking moiety is a hydrocarbon, as defined herein. In some embodiments, the hydrocarbon consists of one or more alkylene chains. In some embodiments, the hydrocarbon comprises two or more alkylene chains that are connected therebetween via a branching unit. In some embodiments, the branching unit comprises or consists of a cycloalkyl.

In some embodiments, the L linking moiety is represented by the Formula:

A1-B-A2 wherein A1 and A2 are each an alkylene chain and B is a branching unit. In some embodiments, B is a cycloalkyl, for example, a cyclohexyl, which is further substituted by one or more alkylene chains.

In some embodiments, A1 and A2 and optional alkylene chains substituting the cycloalkyl are each independently of 3 to 20 carbon atoms in length, or of 3 to 15, or of 3 to 10, or of 5 to 10, carbon atoms in length.

The term "branching unit" as used herein describes a multi-radical, preferably aliphatic or alicyclic group. By "multi-radical" it is meant that the linking moiety has two or more attachment points such that it links between two or more atoms and/or groups or moieties.

In some embodiments, the branching unit is derived from a chemical moiety that has two, three or more functional groups. In some embodiments, the branching unit is a branched alkyl or is a cycloalkyl as defined herein.

In some of any of the embodiments described herein, the linking moiety is selected such that the molecular weight of the BMI is in the range of from 200 to 5000 Daltons, preferably from 300 to 2000 Daltons, or from 300 to 1000 Daltons, of from 500 to 1000 Daltons.

An exemplary BMI includes BMI-689, having a molecular weight of 689 Daltons.

According to some of any of the embodiments described herein, a modeling material formulation comprises one or more bismaleimide(s) as described herein, and/or one or more other polyimide precursor(s). Any other polyimide precursor known in the art is contemplated.

According to some of any of the embodiments described herein, a polyimide precursor is other than a bis-allyl-nadi-imide compound.

According to some of any of the embodiments described herein, the polyimide precursor-containing formulation is devoid of (as defined herein) a bis-allyl-nadi-imide compound.

Exemplary bis-allyl-nadi-imide compounds encompassed by these embodiments are described in EP Patent No. 1857478B1 (see, Formula I therein).

According to some of any of the polyimide precursor undergoes polymerization upon exposure to thermal energy, UV irradiation or both.

By "devoid of" it is meant that that the formulation contains no more than 1%, preferably no more than 0.5%, or no more than 0.1%, or no more than 0.05%, or no more than 0.01%, or no more than 0.005%, by weight, of the total weight of the respective formulation, and even less weight percents, or null, of the indicated material.

According to some of any of the embodiments described herein, a modeling material formulation which comprises a polyimide precursor as described herein (e.g., a bismaleimide) further comprises a solvent.

In some embodiments, the solvent is an organic solvent and in some embodiments it is an organic polar solvent.

Suitable solvents include alcohols, and carboxylic acid esters. Suitable organic solvents are characterized by a boiling temperature below 190° C. and a low evaporation rate, lower than 1, or lower than 0.5, preferably lower than 0.3.

An evaporation rate, as used herein, refers to n-butyl acetate as the reference material.

Exemplary suitable solvents include, but are not limited to, n-butyl acetate, n-pentyl acetate, n-hexyl acetate, n-heptyl acetate, n-butyl propionate, n-pentyl propionate, n-hexyl propionate, n-heptyl propionate, hexanol, butanol, pentanol, heptanol, as well branched alcohols, and esters containing branched alkyls.

In some embodiments the weight ratio between the polyimide precursor and the organic solvent is in the range of from 50:50 to 99:1, or from 50:50 to 90:10, or from 60:40 to 90:10, or from 70:20 to 90:10. In some embodiments, the weight ratio is 80:20.

In some of any of the embodiments described herein, a modeling material formulation that comprises a polyimide precursor as described herein (e.g., BMI) undergoes fast curing (1-20 seconds per layer), forming a three-dimensional network of a thermosetting polyimide-containing material.

The curing can be done by exposure to thermal energy (heat), UV irradiation, or both.

According to some of any of the embodiments described herein, one or more of the modeling material formulation(s) further comprises one or more additional curable material(s).

The additional curable material can be a mono-functional curable material, a multi-functional curable material, or a mixture thereof, and each material can be a monomer, an oligomer or a polymer, or a combination thereof.

Preferably, but not obligatory, the additional curable material is polymerizable when exposed to the same curing condition (e.g., curing energy) at which the polyimide precursor is polymerizable, for example, upon exposure to irradiation (e.g., UV-vis irradiation).

In some embodiments, the additional curable material is a mono-functional acrylate or methacrylate ((meth)acrylate). Non-limiting examples include isobornyl acrylate (IBOA), isobornylmethacrylate, acryloyl morpholine (ACMO), phenoxyethyl acrylate, marketed by Sartomer Company (USA) under the trade name SR-339, urethane acrylate oligomer such as marketed under the name CN 131B, and any other acrylates and methacrylates usable in AM methodologies.

In some embodiments, the additional curable material is a multi-functional acrylate or methacrylate ((meth)acrylate). Non-limiting examples of multi-functional (meth)acrylates include propoxylated (2) neopentyl glycol diacrylate, marketed by Sartomer Company (USA) under the trade name SR-9003, Ditrimethylolpropane Tetra-acrylate (DiTMPTTA), Pentaerythitol Tetra-acrylate (TETTA), and Dipentaerythitol Penta-acrylate (DiPEP), and an aliphatic urethane diacrylate, for example, such as marketed as Ebecryl 230. Non-limiting examples of multi-functional (meth)acrylate oligomers include ethoxylated or methoxylated polyethylene glycol diacrylate or dimethacrylate, ethoxylated bisphenol A diacrylate, polyethylene glycol-polyethylene glycol urethane diacrylate, a partially acrylated polyol oligomer, polyester-based urethane diacrylates such as marketed as CNN91.

In some of any of the embodiments described herein, one or more of the modeling material formulation(s) further comprises an initiator, for promoting the hardening (solidification, curing) of the curable materials, for example, by initiating or promoting polymerization of the polymerizable curable materials.

When all curable materials (polyimide precursor and additional, if present) are photopolymerizable, a photoinitiator is usable in these embodiments.

Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photoinitiators are alpha-amino ketone, bisacylphosphine oxide (BAPO's), and those marketed under the tradename Irgacure®.

A photo-initiator may be used alone or in combination with a co-initiator. Benzophenone is an example of a photoinitiator that requires a second molecule, such as an amine, to produce a free radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

A concentration of a photoinitiator in a formulation containing same may range from about 0.1 to about 5 weight percents, or from about 1 to about 5 weight percents, including any intermediate value and subranges therebetween.

According to some of any of the embodiments described herein, one or more of the modeling material formulation(s) further comprises a curable or non-curable material that chemically interacts with the polyimide precursor (e.g., via Michael addition or Diels-Alder reaction, as described herein). As exemplary such material is a polyamine or a polyamine precursor.

In some of any of the embodiments described herein, a modeling material formulation can further comprise one or more additional materials, which are referred to herein also as non-reactive materials.

Such agents include, for example, surface active agents, stabilizers, antioxidants, fillers, pigments, dispersants, and/or impact modifying agents (toughening agents or toughness modifiers).

In cases of multi-jetting methodologies (when two or more modeling material formulations are dispensed while forming at least a few of the plurality of layers), the non-reactive agents can be independently included in one or all of the modeling material formulations.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, a modeling material formulation comprises a surface active agent. A surface-active agent may be used to reduce the surface tension of the formulation to the value required for jetting or for printing process, which is typically between 10 dyn/cm and 50 dyn/cm, for instance about 30 dyn/cm. An exemplary such agent is a silicone surface additive.

Suitable stabilizers (stabilizing agents) include, for example, thermal stabilizers, which stabilize the formulation at high temperatures.

In some embodiments, the modeling formulation comprises one or more pigments. In some embodiments, the pigment's concentration is lower than 35%, or lower than 25% or lower than 15%, by weight.

The pigment may be a white pigment. The pigment may be an organic pigment or an inorganic pigment, or a metal pigment or a combination thereof.

In some embodiments the modeling formulation further comprises a dye.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

In some of any of the embodiments described herein, one or more of the modeling material formulations comprises a toughening agent.

Non-limiting examples of toughening agents include elastomeric materials. Representative examples include, without limitation, natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers. Preferred agents are elastomers such as polybutadienes. Toughening agents such as elastomeric materials can be added to the formulation by incorporating in a modeling material formulation an elastomeric material in a dispersed/dissolved phase.

A concentration of elastomeric materials may range from about 0.10 phr to about 10 phr, or from about 0.1 phr to about 5 phr, relative to the weight of the formulation containing same.

A concentration of elastomeric materials may alternatively range from about 0.1% to about 20%, by weight, of the total weight of a formulation containing same.

Other impact modifying agents, such as, for example, carbon fibers, carbon nanotubes, glass fibers, aramid Kevlar, polyparaphenylene benzobisoxazole Zylon, and other polar and non-polar impact modifiers, are also contemplated.

Photo-curing can be done by UV sources, such as Xe lamp, mercury lamp, LED UV lamp, intense pulsed light (IPL), or UV laser, with intensity of up to 2000 $J/cm^2$ in the UV-VIS spectral range.

Thermal curing can be done by UV-VIS radiation or conduction, for example by using infrared lamp, and/or heating of the printed surface by heating of the printing tray or the environment in the chamber.

Thermal curing can be enhanced by addition of peroxide catalyst, such as dicumyl peroxide (added at 0.01-2 wt. %) or thermo epoxy catalyst, such as tertiary amines, imidazoles and alcohols.

Whenever a viscosity or any other property is described herein, this property is determined according to procedures and/or by measurements devices which are commonly used in the art for determining the respective property. Exemplary procedures and devices are defined in the Examples section that following (under the "Materials and Experimental Methods" section).

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Herein throughout, the term "(meth)acrylic" encompasses acrylic and methacrylic compounds.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofuran, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'— linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO₂ group.

The term "acyl halide" describes a —(C=O)R'''' group wherein R'''' is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R''OC(=O)NR'— end group or a —OC(=O)—NR'— linking group, as these phrases are defined hereinabove, with R' and R'' as defined herein.

The term "O-carbamate" describes an —OC(=O)—NR'R'' end group or an —OC(=O)—NR'— linking group, as these phrases are defined hereinabove, with R' and R'' as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R'' end group or a —OC(=S)—NR'— linking group, as these phrases are defined hereinabove, with R' and R'' as defined herein.

The term "N-thiocarbamate" describes an R''OC(=S)NR'— end group or a —OC(=S)NR'-linking group, as these phrases are defined hereinabove, with R' and R'' as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R'' end group or a —SC(=S)NR'— linking group, as these phrases are defined hereinabove, with R' and R'' as defined herein.

The term "N-dithiocarbamate" describes an R''SC(=S)NR'— end group or a —SC(=S)NR'-linking group, as these phrases are defined hereinabove, with R' and R'' as defined herein.

The term "urea", which is also referred to herein as "ureido", describes a —NR'C(=O)—NR''R''' end group or a —NR'C(=O)—NR''— linking group, as these phrases are defined hereinabove, where R' and R'' are as defined herein and R''' is as defined herein for R' and R''.

The term "thiourea", which is also referred to herein as "thioureido", describes a —NR'—C(=S)—NR''R''' end group or a —NR'—C(=S)—NR''— linking group, with R', R'' and R''' as defined herein.

The term "amide" as used herein encompasses C-amide and N-amide.

The term "C-amide" describes a —C(=O)—NR'R'' end group or a —C(=O)—NR'— linking group, as these phrases are defined hereinabove, where R' and R'' are as defined herein.

The term "N-amide" describes a R'C(=O)—NR''— end group or a R'C(=O)—N— linking group, as these phrases are defined hereinabove, where R' and R'' are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R''NC(=N)— end group or a —R'NC(=N)— linking group, as these phrases are defined hereinabove, where R' and R'' are as defined herein.

The term "guanidine" describes a —R'NC(=N)—NR''R''' end group or a —R'NC(=N)— NR''— linking group, as these phrases are defined hereinabove, where R', R'' and R''' are as defined herein.

The term "hydrazine" describes a —NR'—NR"R''' end group or a —NR'—NR"— linking group, as these phrases are defined hereinabove, with R', R", and R''' as defined herein.

As used herein, the term "hydrazide" describes a —C(=O)—NR'—NR"R''' end group or a —C(=O)—NR'—NR"— linking group, as these phrases are defined hereinabove, where R', R" and R''' are as defined herein.

As used herein, the term "thiohydrazide" describes a —C(=S)—NR'—NR"R''' end group or a —C(=S)—NR'—NR"— linking group, as these phrases are defined hereinabove, where R', R" and R''' are as defined herein.

As used herein, the term "alkylene glycol" describes a —O—[(CR'R")$_z$—O]$_y$R''' end group or a —O—[(CR'R")$_z$—O]$_y$— linking group, with R', R" and R''' being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Materials and Experimental Methods

Materials:
BMI-based ink was prepared by dissolving 80 wt. % BMI oligomer, BMI-689 (Designer Molecules Inc.), in n-Hexyl Acetate, 99% (Alfa Aesar) with the addition of free radical photoinitiators as follows: 2 wt. % of Irgacure 819 (BASF) and 1 wt. % Irgacure TPO-L (BASF).

Conductive ink containing silver nanoparticles, Sicrys™ I50TM-115 by PV Nano Cell, was used for printing trials.
Analytical Methods:
The viscosity of BMI-based ink was measured by Rolling-ball viscometer (Lovis 2000 M/ME, Anton Paar) with thermoregulation by water circulation (F12, Julabo).

The surface tension of the BMI solutions was measured by Sigma Force Tensiometer, model 700/701, by Biolin Scientific, using the du Noüy ring method.

Dynamic surface tension of the BMI-based ink was measured using Bubble Pressure Tensiometer, BP100 by KRUSS.

Contact angle measurements were performed on Contact Angle Goniometer, Model No. 200-F1 by Rame'-hart Instruments Co.

TGA 550, by TA Instruments, was used for thermogravimetric analysis. Hexyl acetate 100%, was heated in an aluminum crucible of 5.6 mm diameter, in a ramp of 20° C./min to the each of the following temperatures: 25° C., 55° C., 65° C., 70° C. and 75° C., with isothermal dwell time of 15 minutes at each temperature. The weight loss per temperature was calculated from the isothermal part only.
Printing:
The printing of 3D models was performed on Stratasys (Objet) Connex2 3D inkjet printer, equipped with Ricoh E1 printing heads, thermoregulated printing tray, and Ceramic Infrared Heater (P=500 W, model T-HTS/2, Elstein), unless otherwise indicated. The printing trials were performed in single jetting mode, with a layer thickness of 28 µm.

Additional tests were conducted using Ricoh GEN4L printing head.

Example 1

The physical properties that define the capability of jetting are the surface tension, density, bulk modulus, speed of sound, viscosity of the formulation and the dimensions of the nozzle. The drop formation process has three main parts: (i) detachment from the orifice plate, (ii) flight, and (iii) impact on the surface. In materials with high vapor pressure, such as certain solvents, the effect of evaporation needs to be examined. In small drops the vapor pressure increase and thereby lead to a dramatic evaporation. The effect of evaporation can change the meniscus position and to result in bad jetting, wetting and nozzle failure.

Surface tension inertia and viscosity play key roles in the formation and behavior of liquid jets and drops. For a detailed description, see, for example, Hutchings, Ian M., and Graham D. Martin, eds. *Inkjet technology for digital fabrication.* John Wiley & Sons, 2012, p 26].

Two important dimensionless numbers can be used to characterize the relative importance of these parameters: the Reynolds (Re) number and Weber (We) number.

The Re represents the ratio between the inertial and viscosity forces in a moving fluid and is defined by:

$$Re = \frac{\rho d v}{\eta}$$

where ρ, η, d, and v are the density, viscosity, characteristic length of the jet and the velocity, respectively.

The We number depends on the ratio between the inertia and the surface tension:

$$We = \frac{\rho d v^2}{\sigma}$$

where σ is the surface tension.

The influence of the velocity in those two dimensionless groups can be removed by combining them to form a further group, the Ohnesorge number (Oh):

$$Oh = \frac{\sqrt{We}}{Re} = \frac{\eta}{\sqrt{\sigma \rho d}}.$$

It should be noted that the Oh is independent on the driven condition. If Oh value is too high (Oh>~1) then viscous forces will prevent the separation of a drop, while if it is too low (Oh<~0.1), the jet will form large number of satellite droplets. The ranges of the Oh number noted in this section provide some bounds to the 'printability' of the liquid but other factors must also be considered: the jet must possess enough kinetic energy to be ejected from the nozzle, such that Oh>2/Re, and it is also desirable to avoid splashing of the drop on impact with the substrate such that Oh<20/Re$^{5/4}$ [Inkjet Printing of Functional and Structural Materials: Fluid Property Requirements, Feature Stability, and Resolution; Brian Derby; Annual Review of Materials Research 2010 40:1, 395-414].

An exemplary formulation for inkjet printing optionally and preferably has a viscosity of 14-16 mPa, and a surface tension of 27-32 dyn/cm at the jetting temperature.

A polyimide precursor-containing formulation comprising a bismaleimide and a solvent as described herein at 80:20 weight ratio has a viscosity of 120 mPa at room temperature, which is typically too high for jetting. Viscosity decrease can be achieved by one of the following ways:

diluting with additional solvent, which requires higher energy input for drying the excess solvent, after a layer of the formulation is deposited on the receiving medium, or increasing the jetting temperature, which may result in solvent evaporation within the printing head.

Figure 5A:
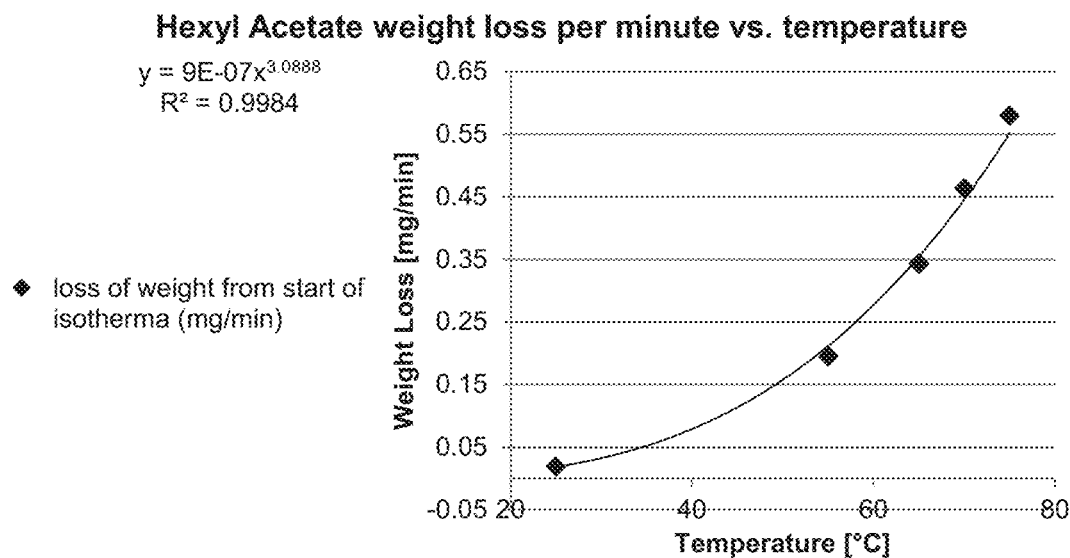
FIGS. 5A-C show weight loss (FIGS. 5A and 5C) and vapor pressure (FIG. 5B) as a function of the temperature, as obtained in experiments performed according to some embodiments of the present invention.

In order to assess solvent evaporation within the printing head, thermogravimetric analysis (TGA) was performed of hexyl acetate as a function of temperature. FIG. 5A presents a plot showing the weight loss of the hexyl acetate, as a function of temperature, measured by ($WL_{TGA}$). The measurement was performed at heating rate of 20° C./minute with liquid surface area of 24 mm$^2$.

Figure 5B:
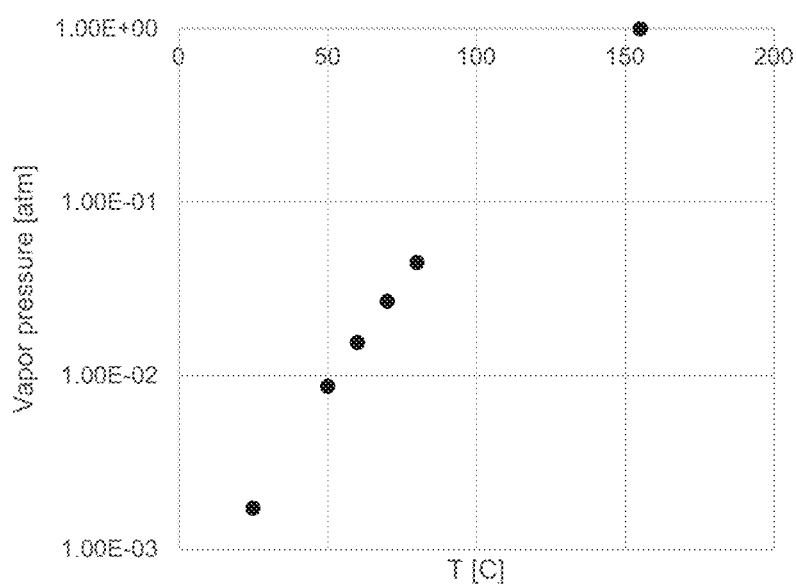
Figure 5C:
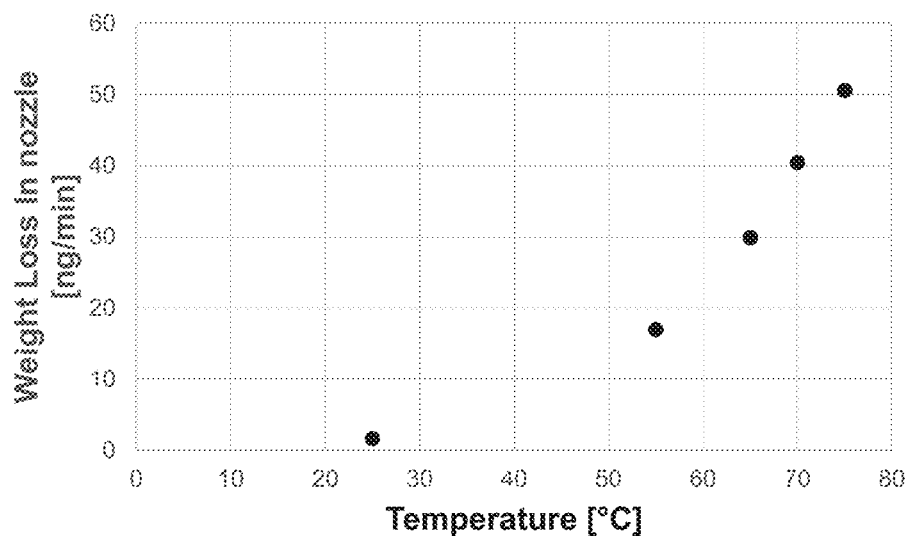

The weight loss in the head's nozzle in ng per minute is shown in FIG. 5C.

The weight loss per time is proportional to the surface between the air and the liquid.

Therefore the weight loss in the nozzle can be regarded as:

$$WL_{NOZZLE} \sim WL_{TGA} \frac{A_{NOZZLE}}{A_{TGA}} \sim WL_{TGA} 8.7 \times 10^{-5}.$$

In small dimensions the surface tension differences:

$$d\sigma = ((\sigma_{air,BMI} + \sigma_{air,orifice}) - \sigma_{orifice,BMI})$$

become a significant player.

This force is in the order of $2\pi r d\sigma$ and the corresponding pressure is $2d\sigma/r$.

For hexyl acetate, the vapor pressure at room temperature and the boiling point are known, and the vapor pressure vs temperature was extrapolated assuming exponential dependent on 1/temperature, as shown in FIG. 5B.

The contact angle of the formulation to the orifice is represented by:

$$\cos \theta_c = (\sigma_{air,orifice} - \sigma_{orifice,BMI})/\sigma_{air,BMI}.$$

Thus:

$$d\sigma = \sigma_{air,BMI}(\cos \theta_c + 1).$$

indicating that when the vapor pressure is reduced in the nozzle, evaporation is reduced.

At 70° C., the vapor pressure is $2.69 \times 10^{-2}$ Atm=2.69 KPa and the surface tension $\sigma_{air,BMI}$ is about 30.25 dyn/cm. The nozzle radius for E1 is about 20 μm, indicating that the pressure can be decreased by about 6.05 KPa for small contact angle θ, thereby decreasing the evaporation rate by a factor of 2 and even higher.

Figure 6:
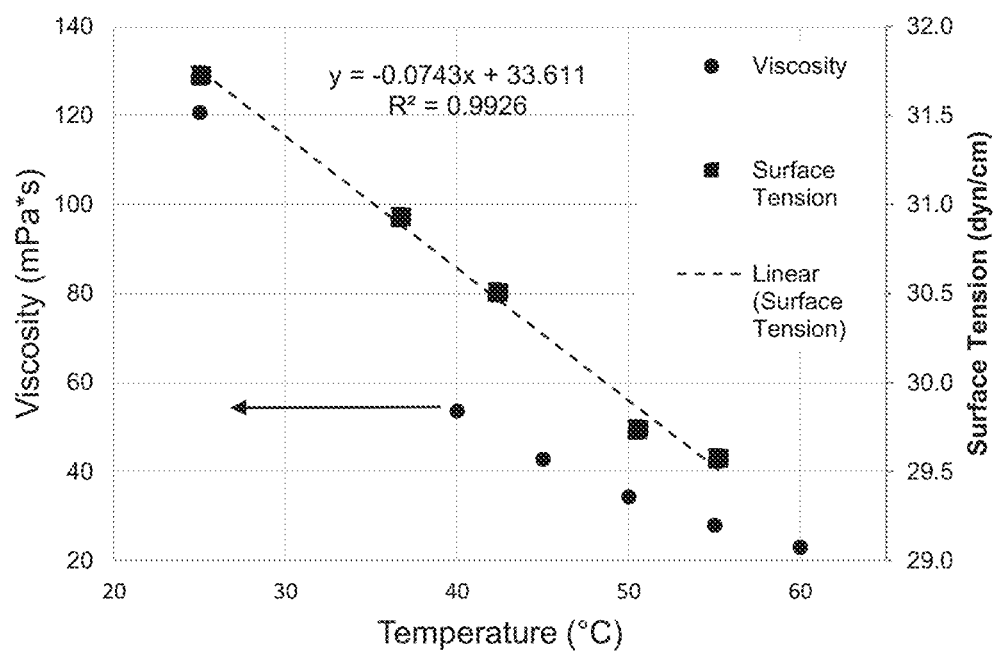
FIG. 6 show viscosity and surface tension as a function of the temperature, as obtained in experiments performed according to some embodiments of the present invention.

FIG. 6 shows the static surface tension and the viscosity of the BMI-based ink as a function of temperature. The static surface tension shows linear correlation with temperature with a slope of −0.0743 and intercept of 33.611. Thus, values of surface tension at higher temperatures can be extrapolated.

Figure 7A:
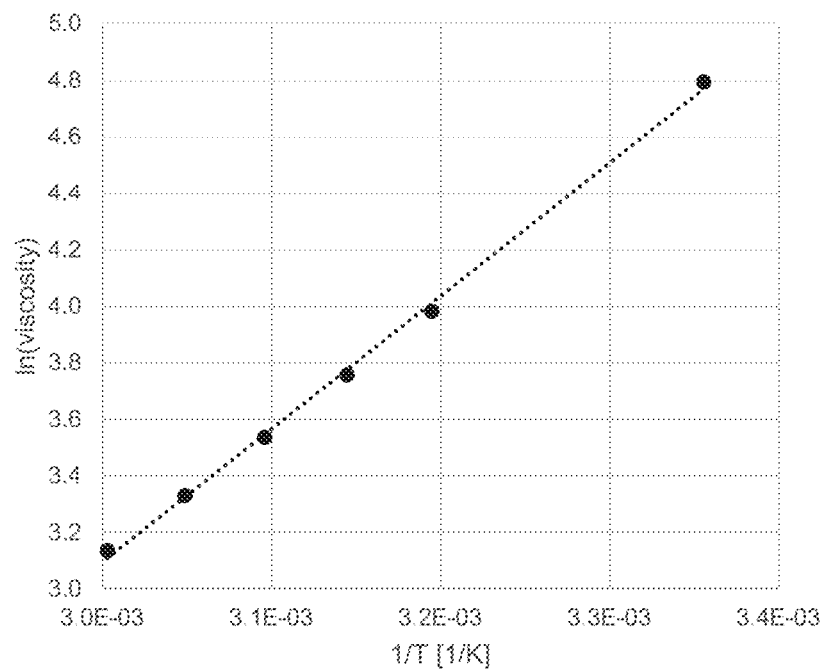
FIG. 7A shows a logarithm of a viscosity as a function of an inverse of a temperature, as obtained in experiments performed according to some embodiments of the present invention.
Figure 7B:
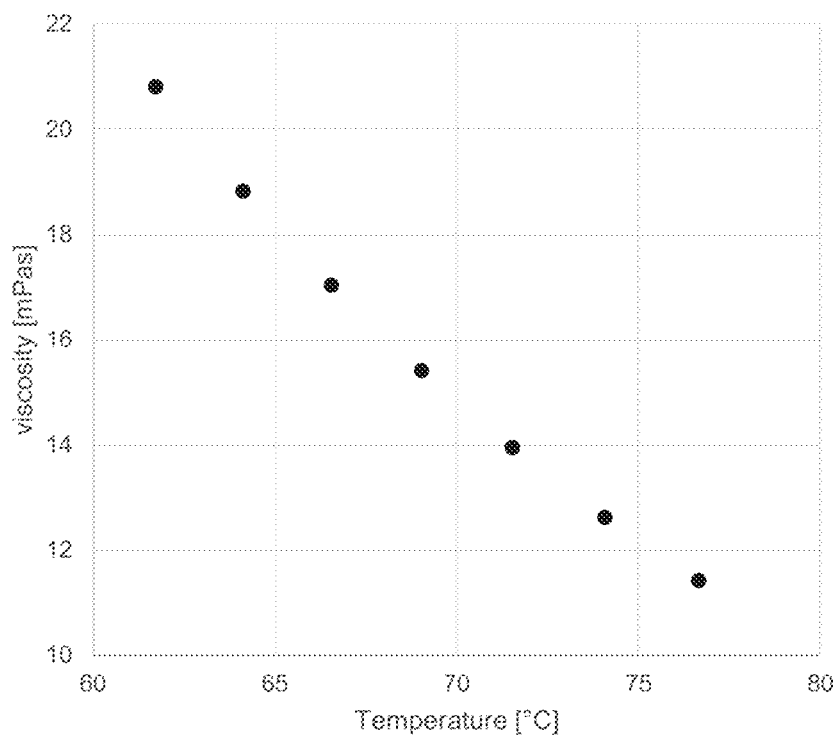
FIG. 7B shows viscosity as a function of the temperature, as obtained in experiments performed according to some embodiments of the present invention.

The viscosity is a logarithmic function of reciprocal temperature, and hence viscosity values at relevant working range can be extrapolated, as shown in FIGS. 7A and 7B, respectively.

As can be seen in FIG. 7B, the temperatures which allow the desired jetting viscosity (14-16 mPa) are 68-72° C. At these temperatures, the corresponding static surface tension is 28.5-28.3 dyn/cm, which can be calculated from the linear fit at FIG. 6. At this temperature range, the corresponding weight loss, is 2.5-3.3 wt. %, as can be seen from FIG. 5A. This mass loss, which results from solvent evaporation, has a negligible effect on viscosity of the ink within the printing head.

Figure 8A:
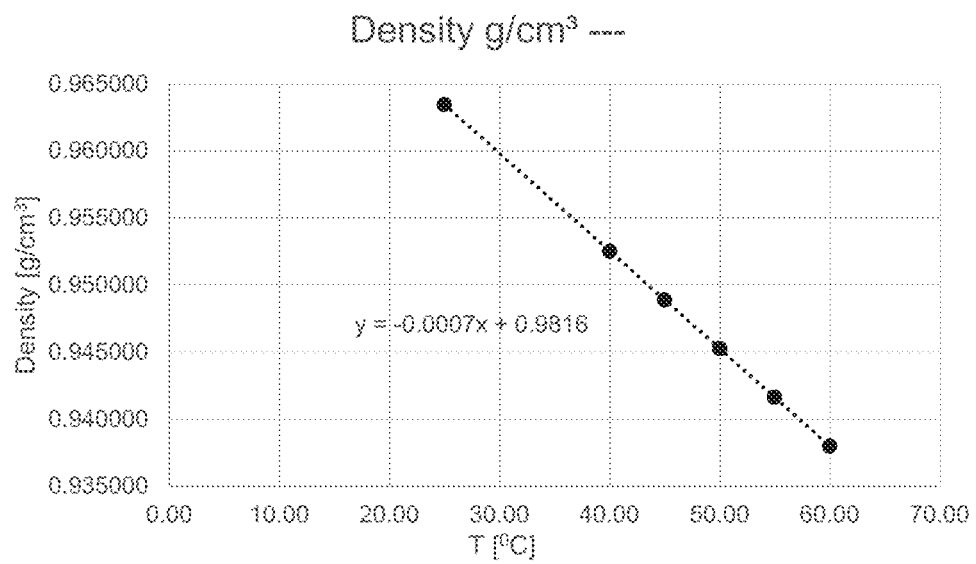
FIGS. 8A and 8B show density (FIG. 8A) and sound velocity (FIG. 8B) as a function of the temperature, as obtained in experiments performed according to some embodiments of the present invention.
Figure 8B:
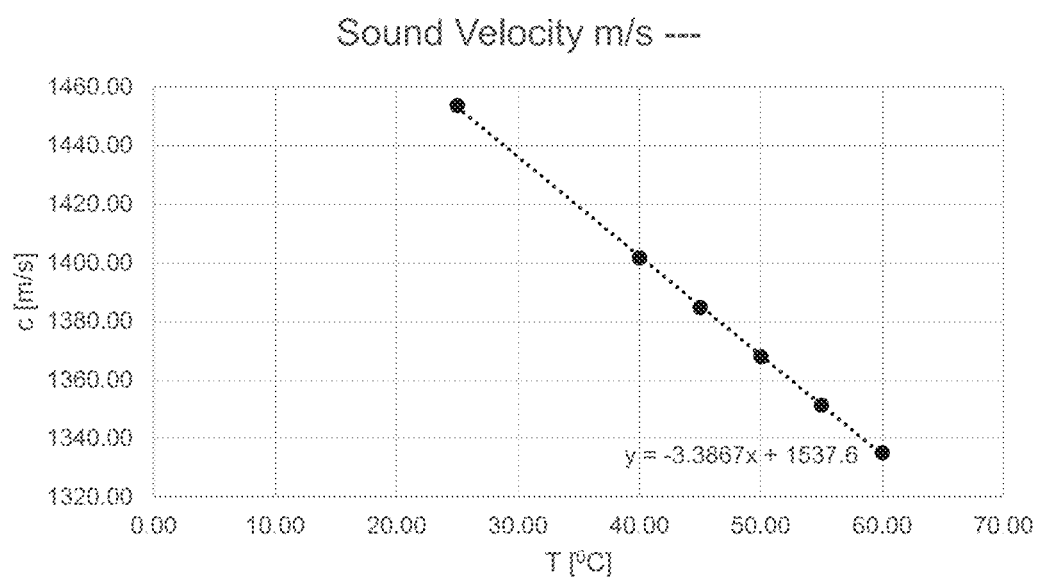

FIGS. 8A and 8B present the data obtained in measurements of the density and sound velocity, respectively, of the BMI-based ink formulation as a function of temperature.

Overall, the measured physical properties of the BMI-containing ink formulation at 70° C. are as follows:
Density: about 0.93 g/cm$^3$
Viscosity: about 15.15 cP=15.15 mPa·s=15.15 ($10^{-3}$ Kg/s$^2$ m$^2$)s
Speed of sound: about 1300 m/s
Surface tension: about 30.25 dyn/cm=30.25 mN/m For GEN4L printing head, with a nozzle having a diameter d of about 20 μm, the following parameters are extracted:

Oh=about 0.63, as follows:

$$Oh = \frac{\eta}{\sqrt{\sigma \rho d}}$$

$$= \frac{15.15 (gm/s2m2)s}{\sqrt{30.25 \, g/s2 * 0.93 \, g/cm3 * 20 \times 10^{-4} \, cm}}$$

$$= \frac{15.15}{\sqrt{30.25 * 0.93 * 20}}$$

$$= \frac{15.15}{\sqrt{30.25 * 0.93 * 20}}$$

$$= \frac{15.15}{23.7}$$

$$= 0.63$$

Re=about 1.227v, as follows:

$$Re = \frac{\rho d v}{\eta}$$

$$= \frac{0.93 \frac{g}{cm3} 20 \times 10^{-4} cm \, 6 - 10 \, m/s}{15.15 \, (gm/s^2m^2)s}$$

$$= \frac{0.93 \, 20 \, v}{15.15}$$

$$= 1.227v$$

and

-continued $$12.96 \frac{m}{s} > v > 2.91 \frac{m}{s}.$$

$$Oh > 2/Re -> v > 2.91 \frac{m}{s}$$

$$Oh < 20/Re^{5/4} -> v < 12.96 \frac{m}{s}$$

$$\eta = 120 \; cP$$

$$Oh = \frac{\eta}{\sqrt{\sigma \rho d}} = 5$$

For E1 printing head, with a nozzle having a diameter d of about 26 µm, the following parameters are extracted:

$Oh$ = about 0.56 as follows:

$$Oh = \frac{\eta}{\sqrt{\sigma \rho d}}$$

$$= \frac{15.15 (gm/s2m2)s}{\sqrt{30.25 \; g/s2 * 0.93 \; g/cm3 * 20 \times 10^{-4} \; cm}}$$

$$= \frac{15.15}{\sqrt{30.25 * 0.93 * 20}}$$

$$= \frac{15.15}{\sqrt{30.25 * 0.93 * 20}}$$

$$= 0.56$$

Re=about 1.59v, as follows:

$$Re = \frac{\rho d v}{\eta}$$

$$= \frac{0.93 \frac{g}{cm3} 26 \times 10^{-4} cm \; 6 - 10 \; m/s}{15.15 \; (gm/s^2 m^2)s}$$

$$= \frac{0.93 \; 26 \; v}{15.15}$$

$$= 1.59v$$

$$10.98 \frac{m}{s} > v > 2.24 \frac{m}{s}.$$

$$Oh > 2/Re = > v > 2.24 \frac{m}{s}$$

$$Oh < 20/Re^{5/4} -> v < \left(\frac{20}{0.56 \; 1.594}\right)^{4/5} -> v < 10.98 \frac{m}{s}$$

$$\eta = 120 \; cP$$

$$Oh = \frac{\eta}{\sqrt{\sigma \rho d}} = 4.43$$

These data show that the BMI-based ink formulation at 70° C. features physical and rheological properties that are suitable for jetting.

Example 2

Jetting Stability Tests

Jetting stability tests were conducted according to some embodiments of the present invention the following instruments were used: a jetting station comprising a motorized magnification camera, a light source (synchronize with fire), a balance device, a 3D inkjet printing system with GEN4L or E1 inkjet printing head, an ink feed system, a vacuum pump and supported electronics (OCB, OHDB and MSC), and software for controlling and analysis. Additional experiments were performed using a three-dimensional printing system.

The magnification camera was used for on-the-fly drop analysis and for identifying wetting of the printing head nozzle. The balance device was used to measure the average drop weight. Density measurements were used to evaluate the drop volume. The control and analysis software was used for extracting the drop velocity per nozzle along the printing head at 1 mm from the printing head (the typical distance between the printing head and the tray), the number of good nozzles, and the drop weight at various jetting parameters—voltage frequency and pulse shape. The ligament length and the formation of satellites were also examined in cases where these were found critical for printing quality. Stability of jetting and the velocity typically determine the drop placement.

Figure 9:
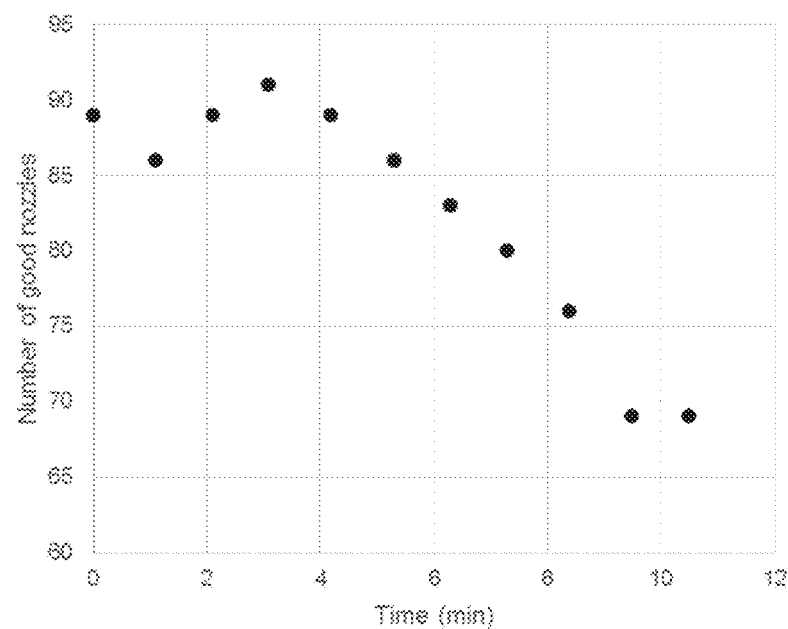
FIG. 9 shows a number of active nozzles as a function of the time, as obtained in experiments performed according to some embodiments of the present invention.

FIG. 9 shows the number of active nozzles as a function of the time during a jetting stability test conducted on the E1 printing head. The wetting blocked the nozzles of the E1 printing head, after about 4 minutes of operation. A cycle of purging and wiping was therefore performed every 4 minutes of operation.

Figures 10A, 10B:
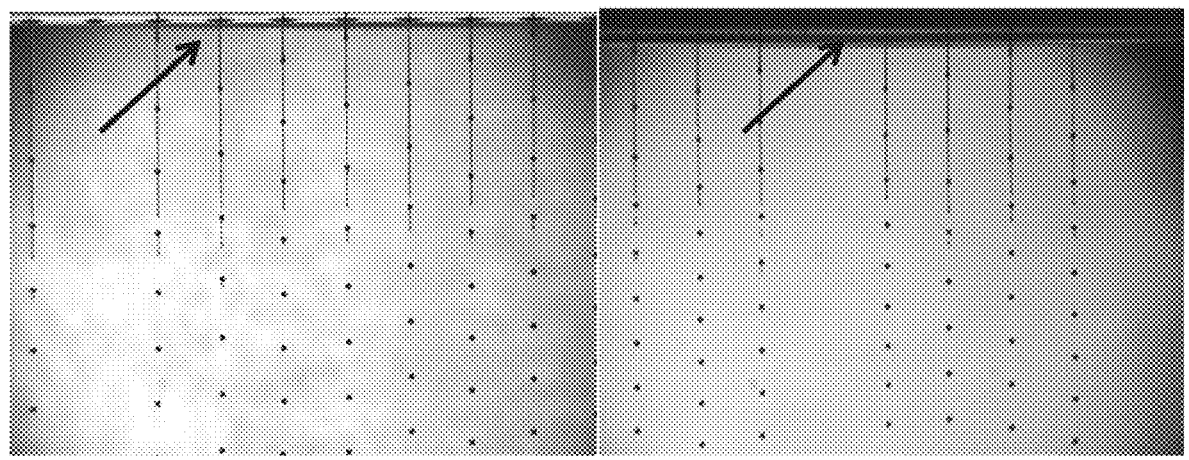
FIGS. 10A and 10B are images of jetting captures at the beginning (FIG. 10A) and end (FIG. 10B) of a stability test conducted according to some embodiments of the present invention using an E1 printing head at a voltage of 30 V, pulse width of 8 μs and frequency of 18 kHz.

FIGS. 10A and 10B are images of jetting captures at the beginning (FIG. 10A) and end (FIG. 10B) of a stability test conducted on the E1 printing head at a voltage of 30 V, pulse width of 8 µs and frequency of 18 kHz. At the beginning of the test, the orifice plate (marked by an arrow), is clear and non-wetted. At the end of the test, a large puddle on the orifice plate was observed.

Figure 11A:
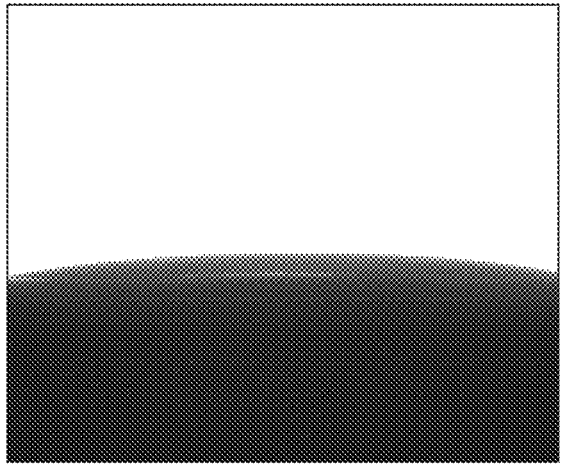
FIGS. 11A and 11B are images demonstrating contact angle measurements at a surface of an E1 printing head (FIG. 11A) and a GEN4L printing head (FIG. 11B), as obtained in experiments performed according to some embodiments of the present invention.
Figure 11B:
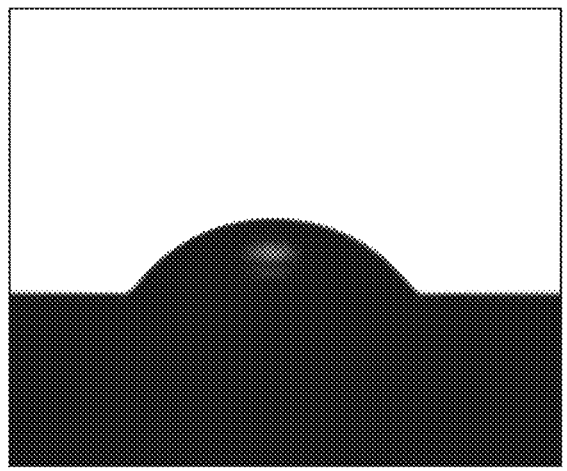

FIGS. 11A and 11B show contact angle measurements at the surface of E1 printing head (FIG. 11A) and the Gen4L printing head (FIG. 11B). The mean contact angle for the E1 printing head was 7.6±2.2° and the mean contact angle for the GEN4L printing head was 50.8±0.3°. It is noted that at the typical printing temperatures (about 70° C.) the saturation vapor pressure is smaller than the equilibrium vapor pressure by about four orders of magnitudes for both contact angles. The effect of saturation vapor pressure is therefore negligible.

Figure 12A:
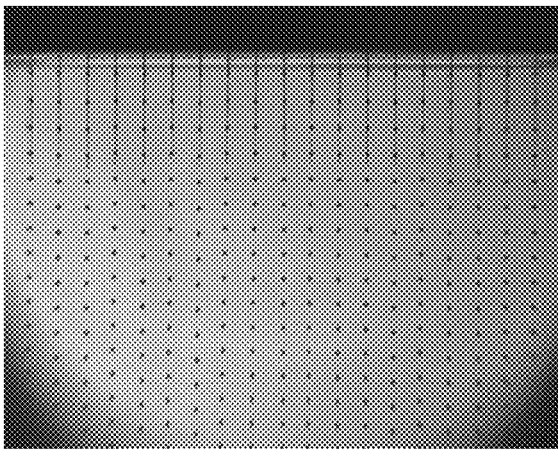
FIGS. 12A and 12B are images of jetting captures at the beginning (FIG. 12A) and end (FIG. 12B) of a stability test conducted according to some embodiments of the present invention on a GEN4L printing head at a voltage of 28.35V, pulse width of 6.2 μs and frequency of 38 kHz.
Figure 12B:
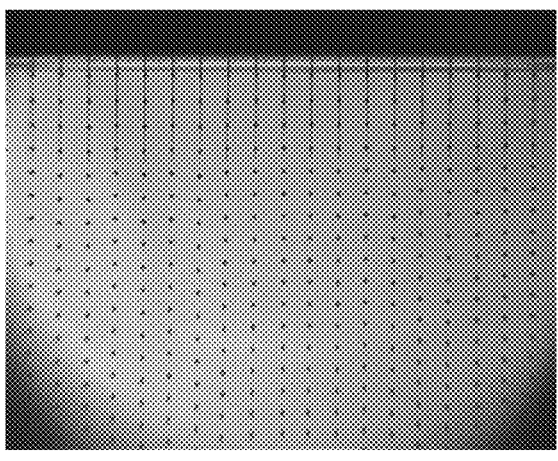

The contact angle for GEN4L is significantly higher, thereby has a lower chances of wetting during printing. FIGS. 12A and 12B are images of jetting captures at the beginning (FIG. 12A) and end (FIG. 12B) of a stability test conducted on the GEN4L printing head at a voltage of 28.35V, pulse width of 6.2 µs and frequency of 38 kHz. As shown this printing head demonstrates stable printing with no significant nozzle failure with time. The jetting stability for this printing head was tested by cycles, wherein each cycle included jetting (1 sec on 1 sec off) for duration of about 5 min, followed by idle time of about 16 min, followed by jetting cycles for 9 minutes.

In the above tests, the waveform (amplitude, frequency and pulse width) of the voltage applied to the printing head, the vacuum pressure, the time between purges or wipes, the idle period were varied.

Figure 13A:
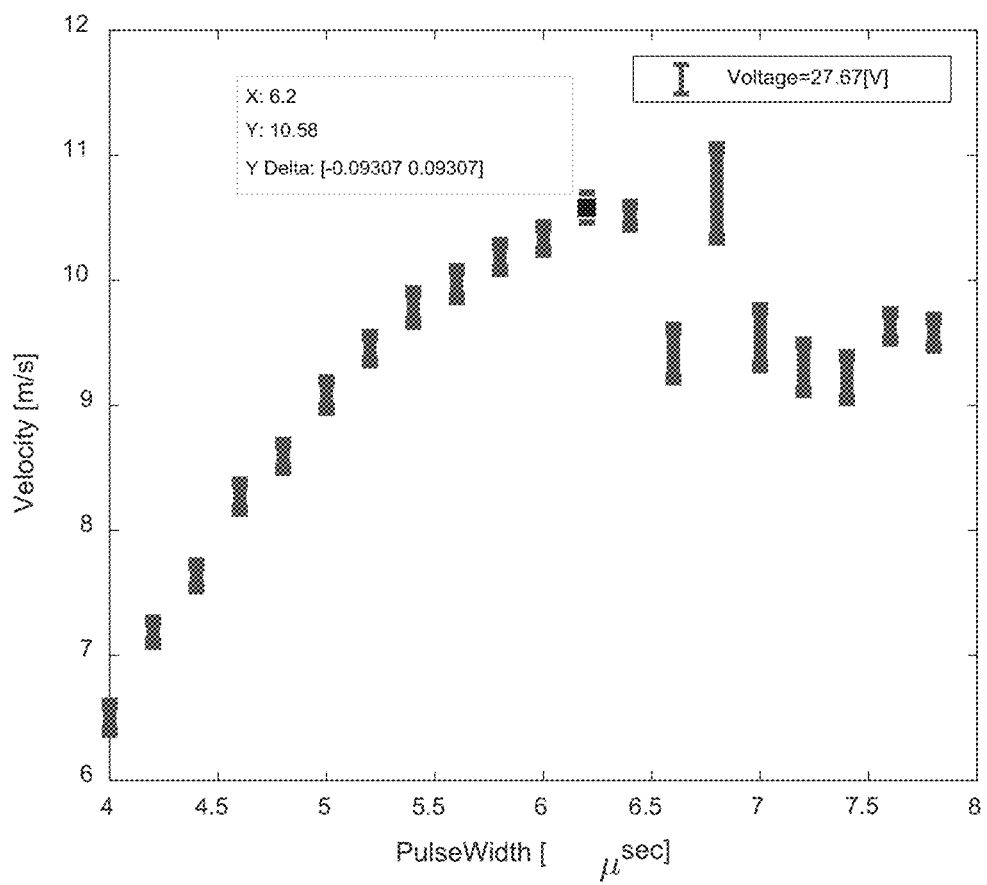
FIG. 13A shows drop velocity as a function of a pulse width, as obtained in experiments performed according to some embodiments of the present invention.
Figure 13B:
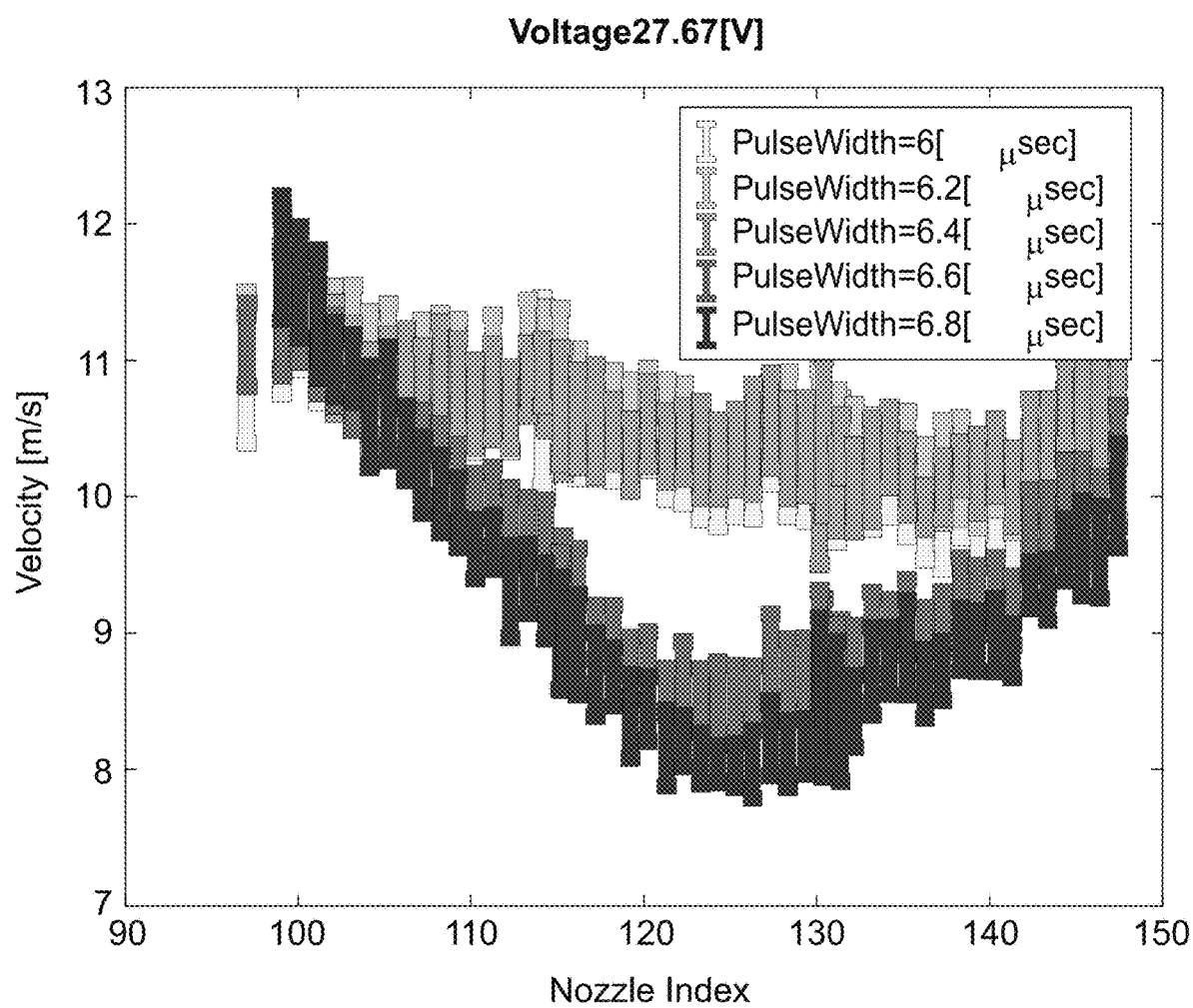
FIG. 13B shows drop velocity at each nozzle at pulse width of 6.2 μs, as obtained in experiments performed according to some embodiments of the present invention.
Figure 13C:
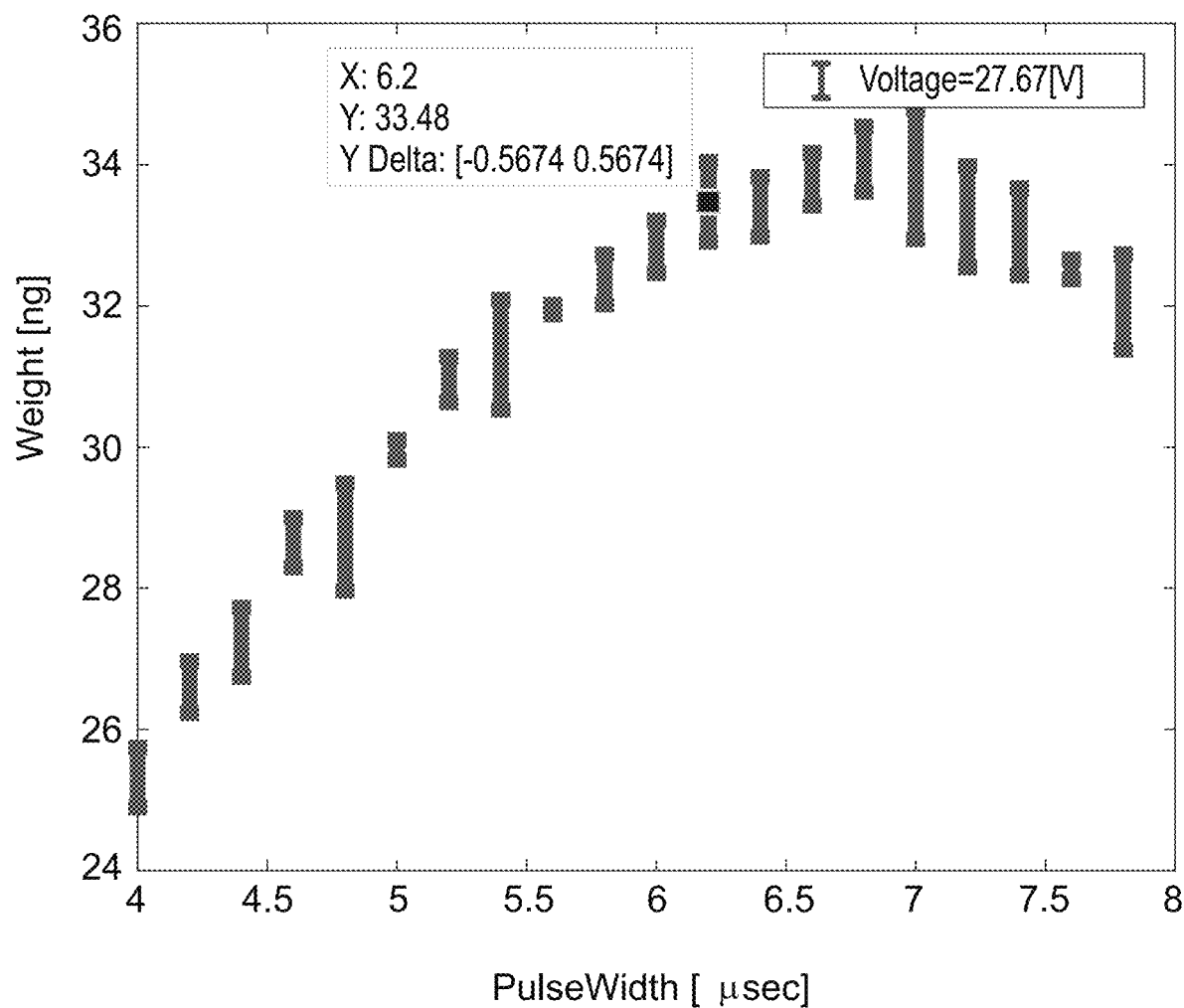
FIG. 13C shows drop weight as a function of the pulse width, as obtained in experiments performed according to some embodiments of the present invention.

FIG. 13A shows the drop velocity as a function of the pulse width, and FIG. 13B shows the drop velocity at each nozzle at pulse width of 6.2 µs, and FIG. 13C shows the drop weight as a function of the pulse width. Stability was observed at a pulse width of about 6.2 µs.

Figure 14A:
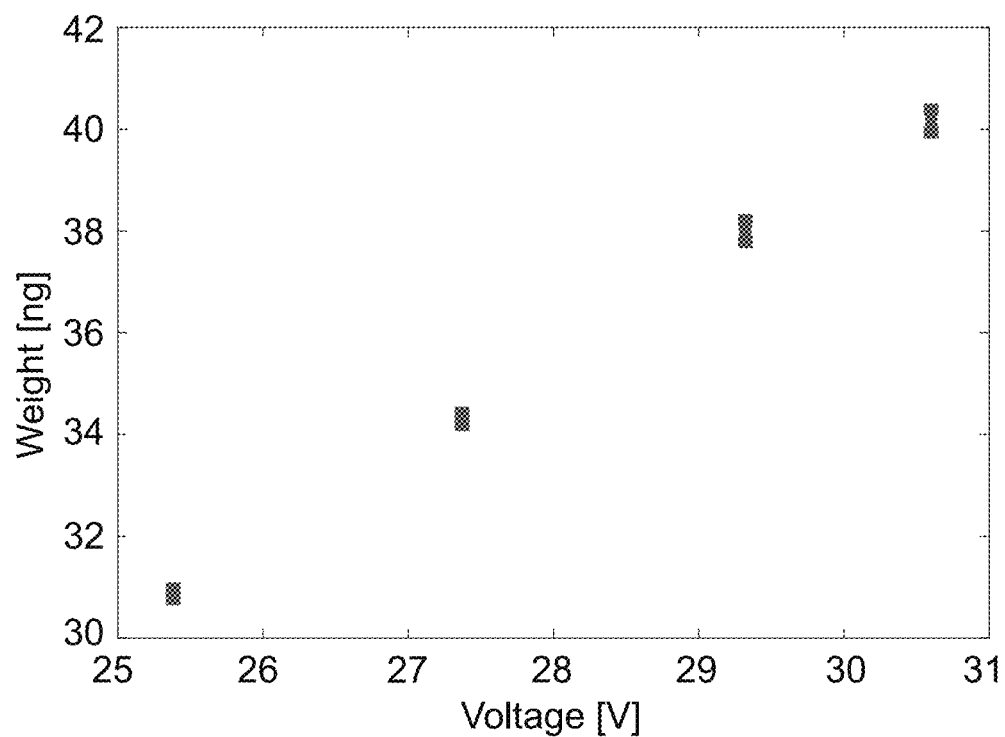
FIG. 14A shows an average drop weight as a function of an applied voltage at a frequency of 38 kHz, as obtained in experiments performed according to some embodiments of the present invention
Figure 14B:
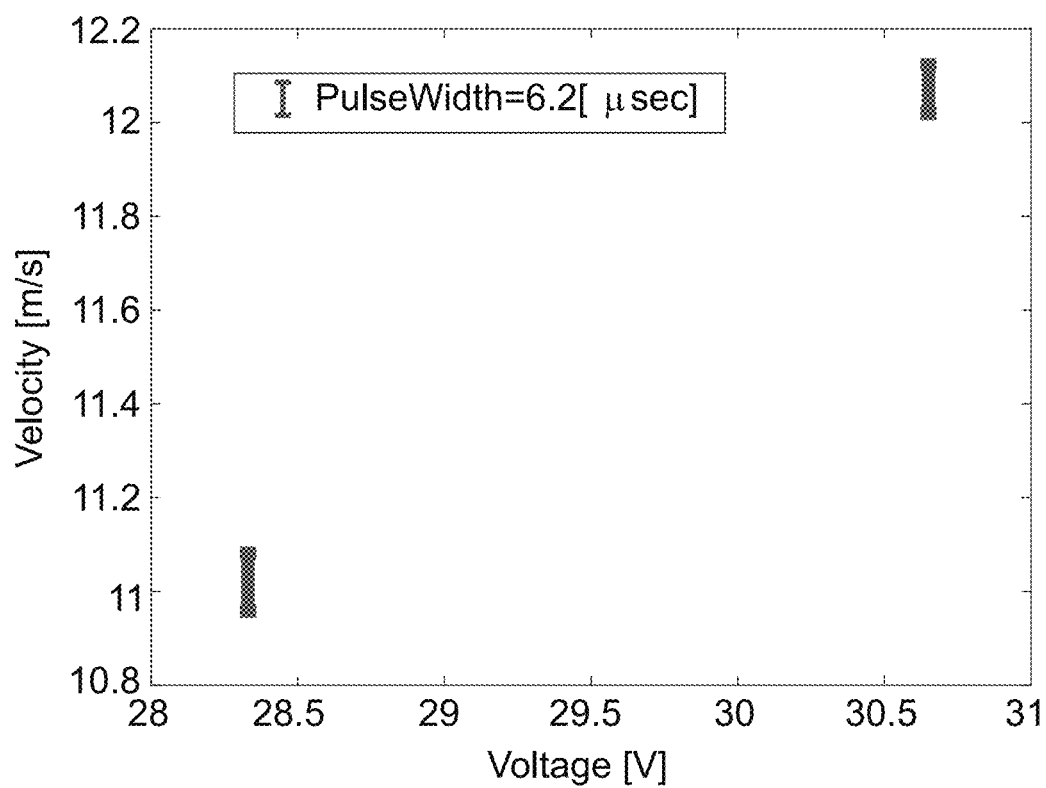
FIG. 14B shows average drop velocity as a function of the applied voltage at a frequency of 38 kHz, as obtained in experiments performed according to some embodiments of the present invention.
Figure 14C:
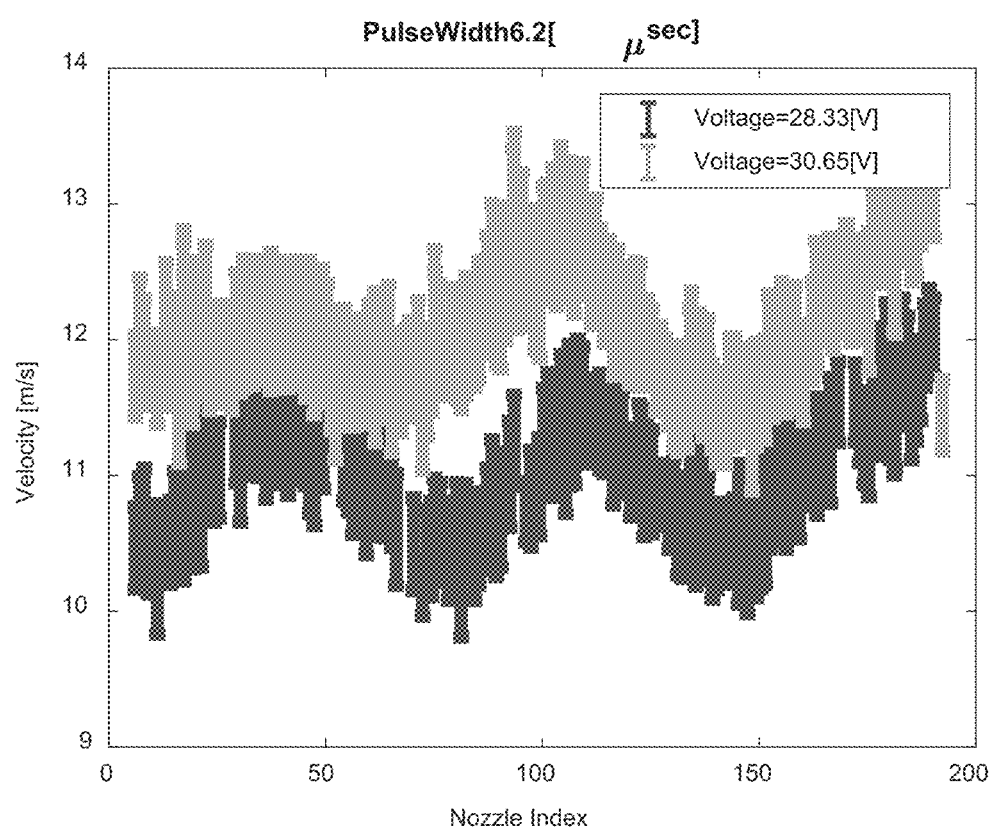
FIG. 14C shows average drop velocity at each nozzle at applied voltages of 28.33 V and 30.65 V, as obtained in experiments performed according to some embodiments of the present invention.

FIGS. 14A and 14B shows the average drop weight (FIG. 14A) drop velocity (FIG. 14B) as a function of the applied voltage at a frequency of 38 kHz, and FIG. 14C shows the average drop velocity at each nozzle at 28.33 V and 30.65 V. Extrapolating the velocity at 26.4 V, assuming linear dependent, results in a velocity of about 10.14 m/s. The high velocity is due to the relatively high viscosity of 15.159 cP. High velocity may be advantageous since it reduces the likelihood of wetting.

For a polyimide precursor-containing modeling formulation comprising a bismaleimide and a solvent as described herein at 80:20 weight ratio, preferred printing parameters suitable for printing of using a printing head having an nozzle diameter of from about 24 μm to about 28 μm (e.g., the E1 printing head) are listed in Table 1, below, and preferred printing parameters suitable for printing using a printing head having a nozzle diameter of from about 18 μm to about 23 μm (e.g., the GEN4L printing head) are listed in Table 2, below.

TABLE 1

| Parameter | preferred value | tolerance |
| --- | --- | --- |
| T [° C.] | 68 | ±2 |
| Viscosity [cP] | 15 | ±2 |
| Surface tension [dyn/cm] | 28.3 | |
| Density [g/cm$^3$] | 0.93 | ±0.03 |
| target Drop weight [ng] | 81.73-70.8 | ±2 |
| Drop velocity [m/s] | 9.8-8.4 | ±1 |
| Voltage at target drop weight [V] | 28-25 | ±2 V |
| Pulse width [usec] | 8 | ±0.3 usec |
| Fire frequency [KHz] | 18 | ±0.5 KHz |
| jetting over time | <5 | >time between Wiping |
| Jetting after idle time [min] | 0 | >time between Wiping |
| Wiping frequency [min] | 4 | ±1 minutes |

TABLE 2

| parameter | preferred value | tolerance |
| --- | --- | --- |
| T [° C.] | 70 | ±2 |
| Viscosity [cP] | 15.159 | ±2 |
| Surface tension [dyn/cm] | 28.3 | |
| Density [g/cm$^3$] | 0.93 | ±0.03 |
| target Drop weight [ng] | 32.55 | ±2 |
| Drop velocity [m/s] | 10.14 | ±1 |
| Voltage at target drop weight [V] | 26.4 | ±2 V |
| Pulse width [usec] | 6.2 | ±0.3 usec |
| Fire frequency [KHz] | 38 | ±0.5 KHz |
| jetting over time | >15 | >time between Wiping |
| Jetting after idle time [min] | >15 | >time between Wiping |
| Wiping frequency [min] | 15-60 | ±1 minutes |

Example 3

Printing Trials

These trials were conducted using the E1 printing head. To avoid wetting of the orifice plate, the time between purges was reduced to 4 minutes, compared to 15-60 minutes in conventional three-dimensional printing materials. A ceramic infrared (IR) lamp was mounted at distance of about 10 mm from the printing tray, and was always on during the printing sequence, along with UV (Hg) lamps. The temperature of the IR lamp was measured by a thermocouple and could be adjusted by voltage. The purpose of the IR lamp was to evaporate the solvent during printing.

Printing Trial I:

The printing was performed on a glass plate, mounted on a heated (T=60° C.) tray. The IR lamp was calibrated to 600° C. A polyimide sheet (50×30×2 mm) was printed with conductive lines made of silver nanoparticles. The conductive lines were printed simultaneously with the Polyimide matrix, resulting in built-in conductive tracks. The results are shown in FIGS. 15A-C. FIG. 15A shows the printed sheet right after printing, still on glass substrate, FIG. 15B shows the Polyimide sheet after thermal post cure at 150° C. for 1 hour, and FIG. 15C shows the back side of the printed sheet, showing cracks and delamination between layers.

The surface of the printed sheet has very high roughness, with crater-like texture resulting from solvent evaporation. After thermal post treatment the printed sheet developed curling, as a result of internal stresses. These stresses were the result of trapped solvent which did not evaporate properly. Moreover, delamination between printed layers was observed on the bottom part of the sheet (FIG. 15C).

During printing, the ambient temperature within the printing zone increased with time, which is equivalent to the number of layers, due to the heating effect of the IR lamp. The first printed layers (bottom part of the sheet) experienced colder environment relative to the upper layers and thus higher residues of the solvent. This may explain delamination mostly at the bottom.

The thermal post treatment was applied to complete conversion of the maleimide groups, leading to improved mechanical properties and to sinter the silver nanoparticles. The electrical conductivity of the printed conductive tracks was measured prior and after the thermal post treatment. The tracks were not conductive prior the treatment and conductive after the treatment. The measured resistivity 2-8 KΩ, due to micro-cracks formed within the BMI matrix as a result of internal stresses. Consequently, these micro-cracks result in fractures of the conductive tracks.

This experiment demonstrates the ability to print printed circuit boards and other 3D objects containing electrically conductive tracks, in one print.

This process is not possible with conventional techniques due to the low thermal stability (heat deflection temperature of 45-70° C.) of conventional modeling materials, which does not allow sintering of silver nanoparticles.

Printing Trial II

In order to improve drying of the solvent during printing, additional scans with IR lamp were added after each printing slice. It was found that 5 scans resulted in complete drying and curing of the film. FIGS. 16A and 16B are images of a two 3D objects printed in this trial: a 69×11×1.5 mm micro-tensile dog bone (FIG. 16A), and a 10×10×10 mm pyramid (FIG. 16B). The printed objects were solid, dry and non-tacky to touch.

This scan with IR lamp after the dispensing of each layer, improved the surface of the printed objects, and eliminated the crater-like roughness, cracks and delamination.

Printing Trial III

The efficiency of the solvent drying by infrared radiation was investigated by printing polyimide samples using different types and numbers of IR sources, and employing different numbers of scans (0, 4, and 8, in the present Trial). The surface temperature during printing was monitored by an IR sensor as a sampling rate of 100 Hz. Printed samples were weighted with an analytical balance, and TGA was performed in temperature ramp mode and isotherm mode (at 160° C.). The printer used was a modified Stratasys Connex500™ printer with E1 printing heads. The printer was used to print bars 35×10×3 mm, in dimensions. The number of slices was 85.

The following printing parameters were used: the tray temperature was about 90° C., the printing head jetting temperature was about 70° C., the printing mode was single jetting mode with 2 UV lamps operated at 100% power, purging was executed every 240 seconds (to keep orifice plate from wetting), the cooling fans were not operated (to reduce or prevent curling and detachment from the tray).

One of the following IR sources was selected for each one of the experiments:

(i) 1×FIR Lamp (Ceramic), at power of about 500 W and temperature of about 600° K (ii) 1×NIR Lamp (Halogen) at power of about 500 W, and temperature of about 2700° K (iii) 2×NIR Lamp (Halogen) at power of about 1000 W (2×500 W), and temperature of about 2700° K One of the following irradiation protocols was performed for each dispensed and each experiment:

(i) 0 scans (IR source is always on)

(ii) 4 scans (iii) 8 scans

Figure 17:
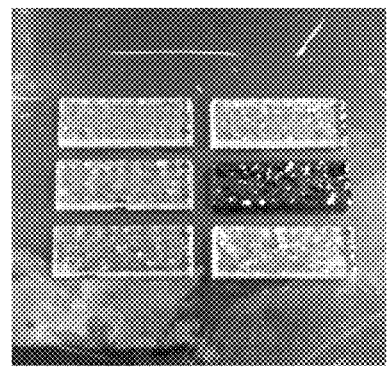
FIG. 17 is an image of polyimide samples printed according to some embodiments of the present invention.

Examples of the printed samples are shown in FIG. 17.

Figure 18:
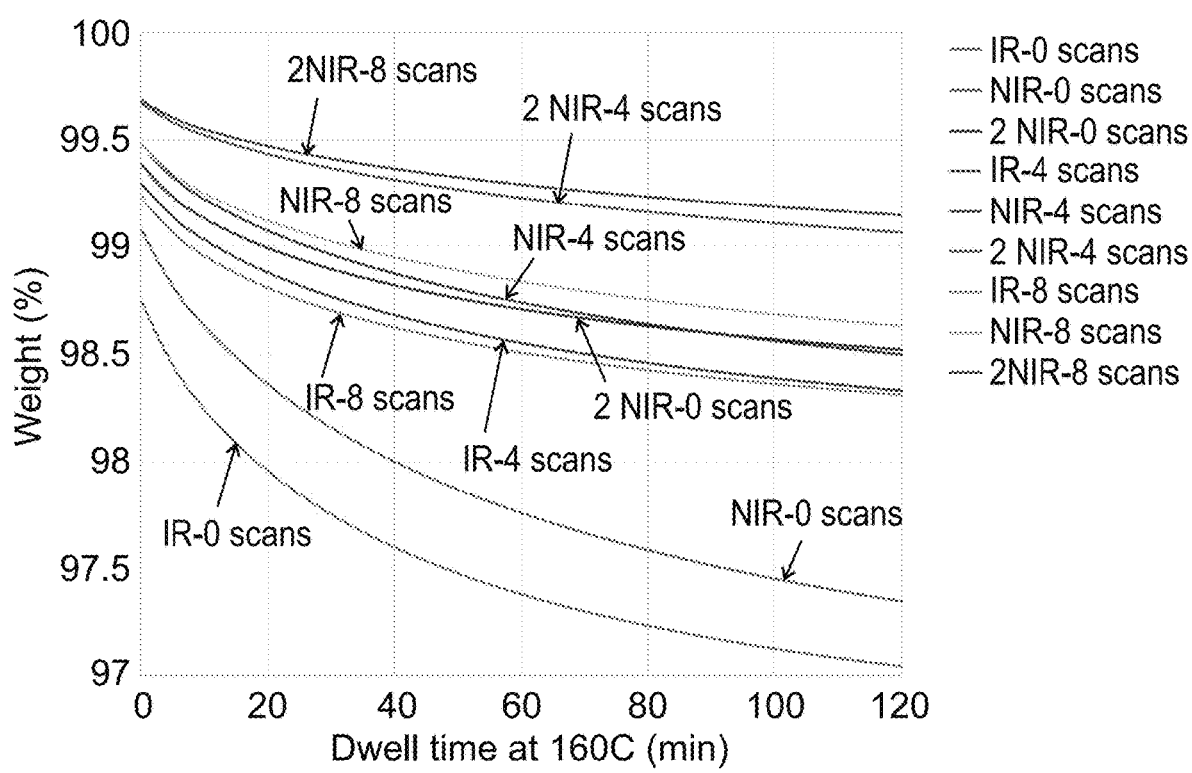
FIG. 18 is a graph showing thermogravimetric analyses of polyimide samples printed according to some embodiments of the present invention.

FIG. 18 shows TGA results of samples printed with different IR sources (1 FIR lamp, 1 NIR lamp, and 2 NIR lamps) with 0 or 8 scanning performed after each slice. The weight loss was recorded during isothermal dwell at 160° C. for 120 minutes. The temperature of 160° C. was selected for the isothermal dwell, since at this temperature pure BMI has no mass loss, and the only volatile component is the hexyl acetate solvent. As shown, all samples show mass loss, even at the higher power irradiation (2 NIR lamps, 8 scans) during printing. The highest mass loss is for the 0 scans experiment. The NIR lamp was slightly more effective than the IR lamp, after 8 scans. The lowest residual solvent content was obtained with 8 scans with 2 NIR lamps.

Figure 19A:
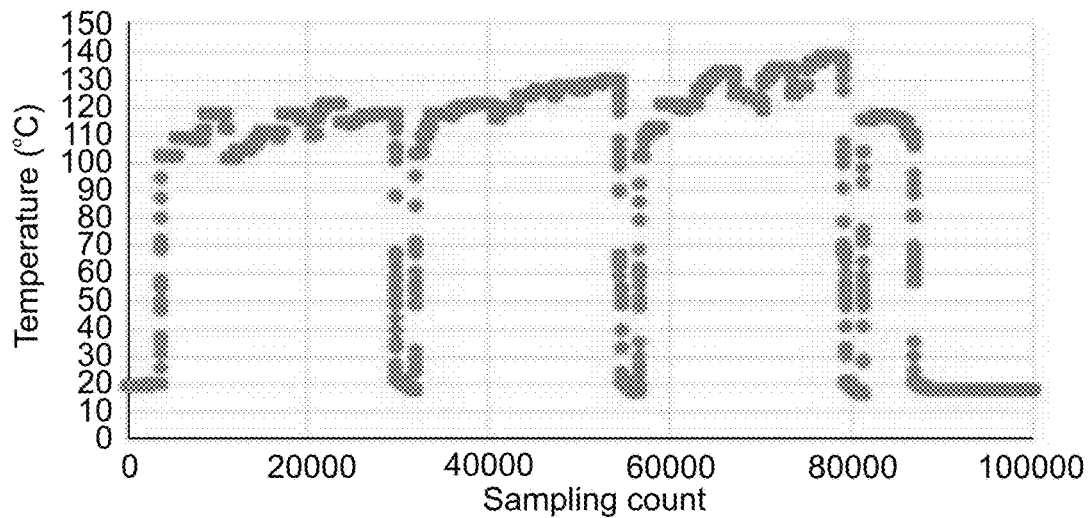
FIGS. 19A-I are graphs showing a temperature of an upper layer for several polyimide samples printed according to some embodiments of the present invention.
Figure 19B:
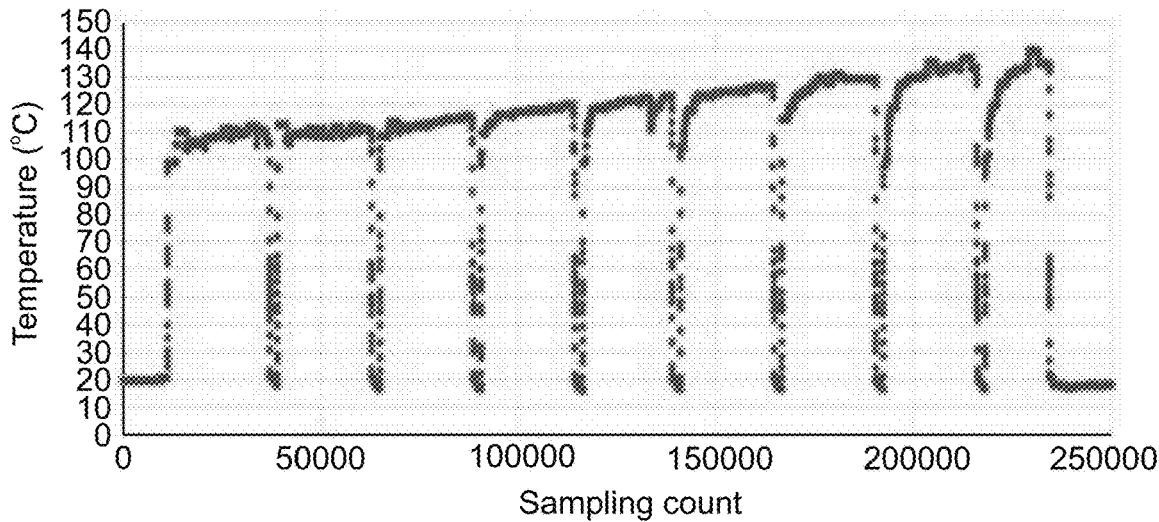
Figure 19C:
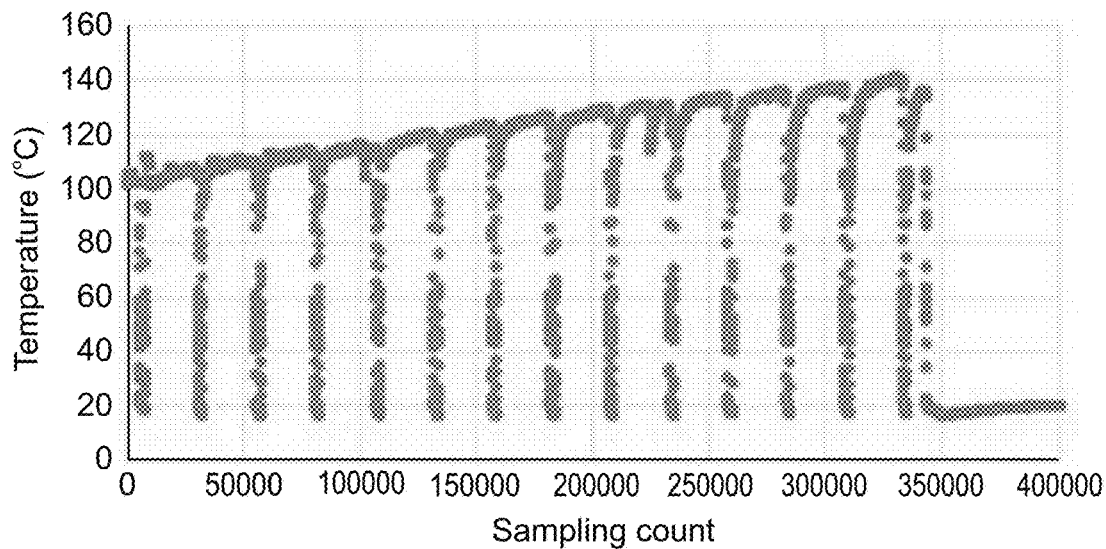
Figure 19D:
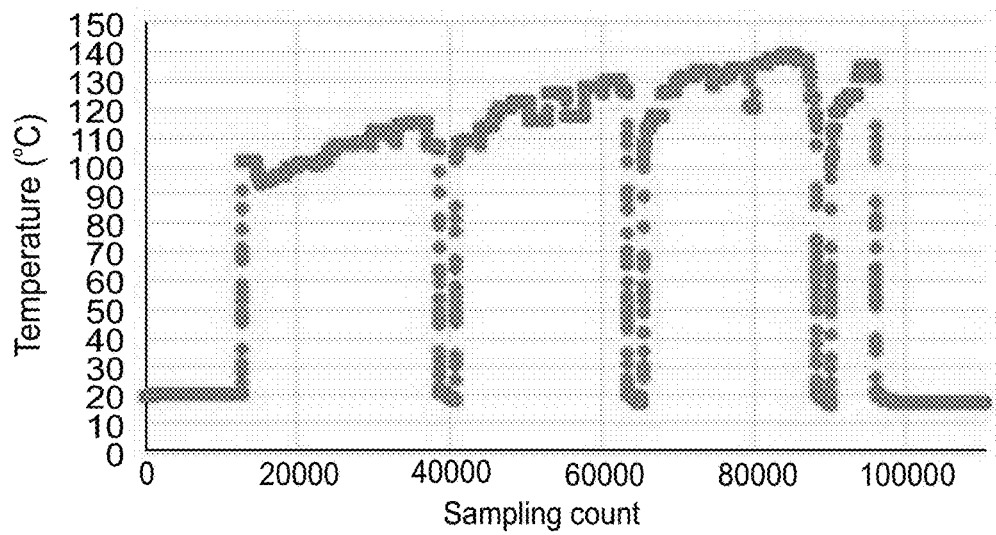
Figure 19E:
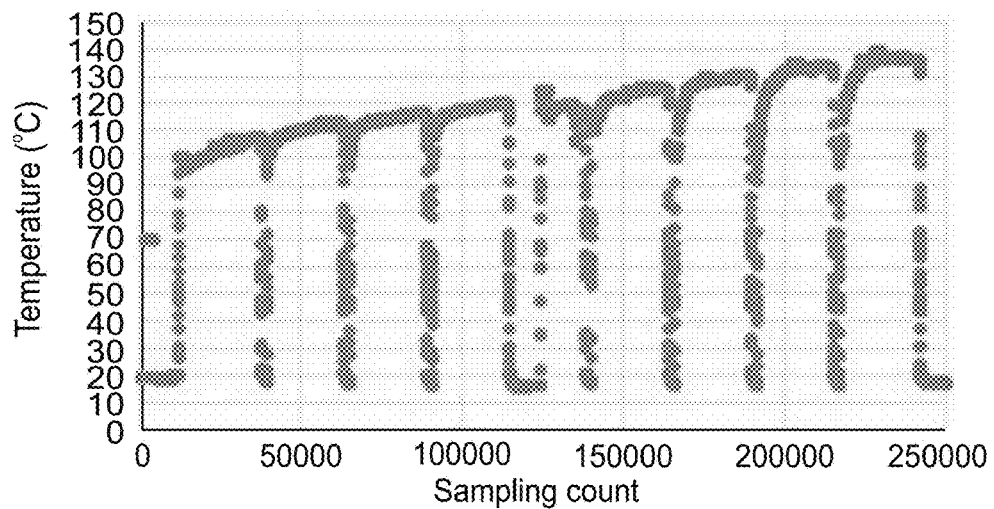
Figure 19F:
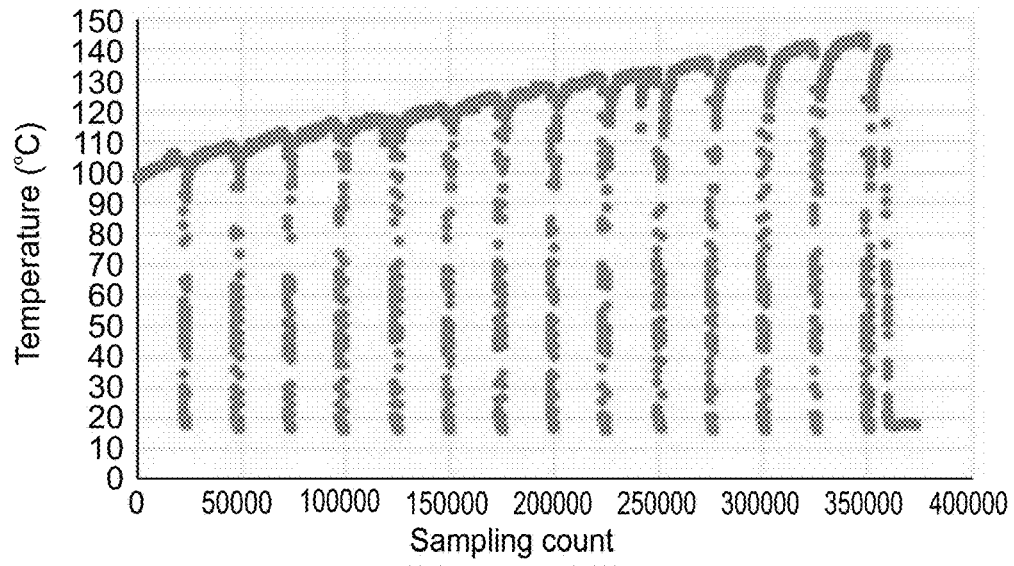
Figure 19G:
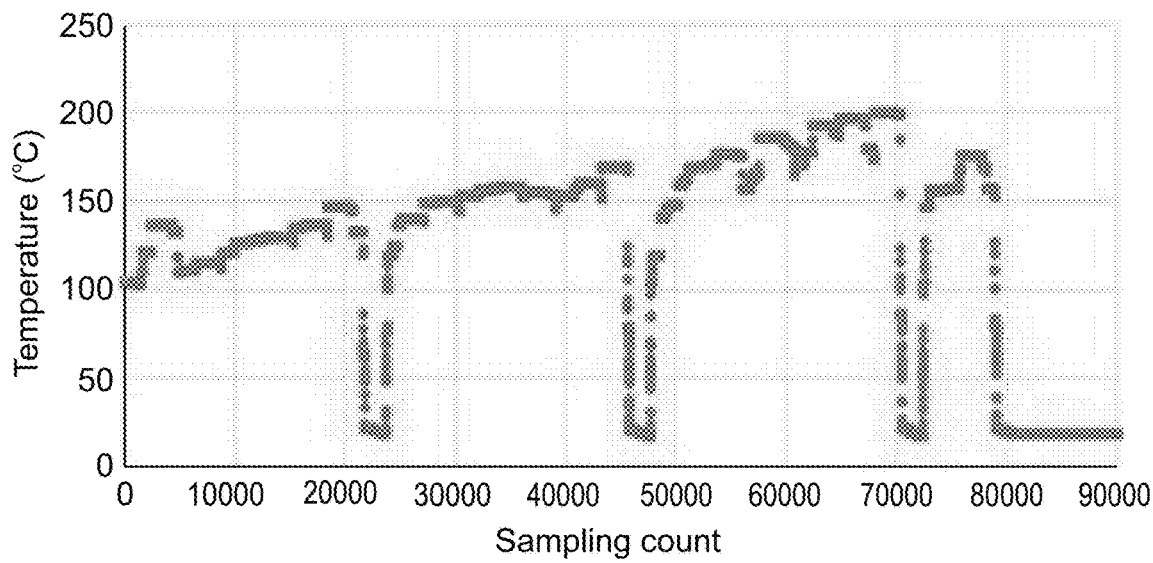
Figure 19H:
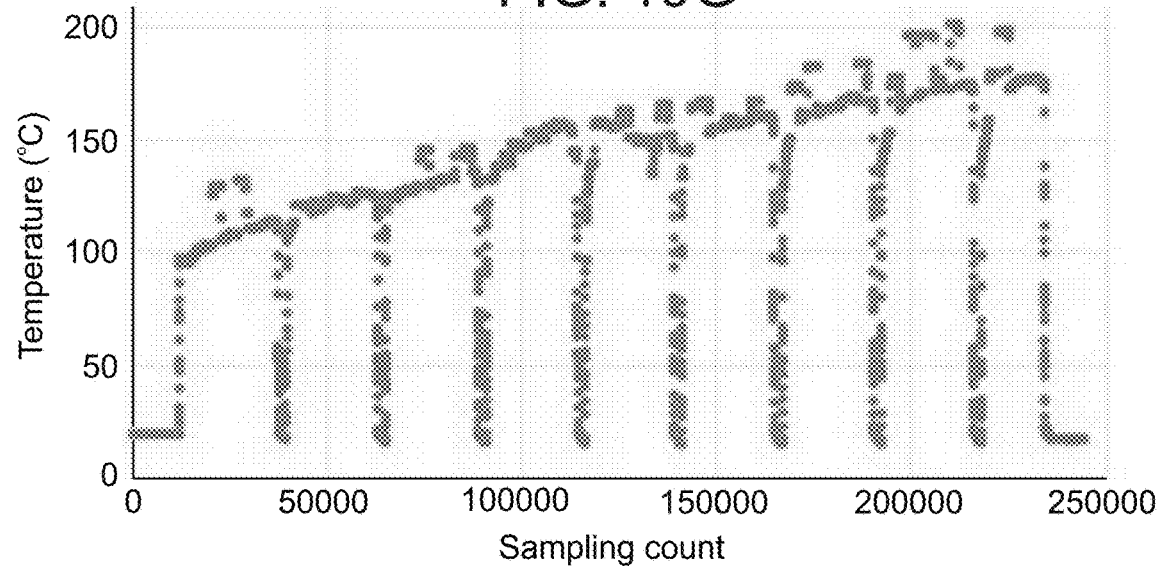
Figure 19I:
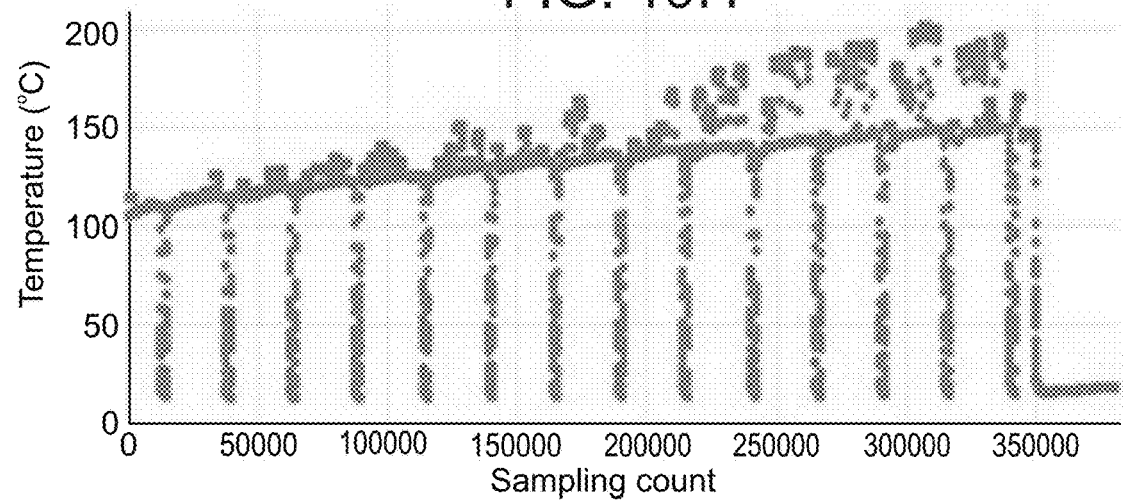

These results are supported by the recorded surface temperature, as shown in FIGS. 19A-I, which show the temperature of the uppermost layer as a function of the IR sampling count (sampling rate was, as sated, 100 Hz). FIGS. 19A-I, show the temperature of the uppermost layer when irradiated with the FIR lamp (FIGS. 19A-C), the NIR lamp (FIGS. 19D-F), and the two NIR lamps (FIGS. 19G-I), according to the 0 scan protocol (FIGS. 19A, 19D and 19G), the 4 scan protocol (FIGS. 19B, 19E and 19H), and the 8 scan protocol (FIGS. 19C, 19F and 19I). The dips in FIGS. 19A-I correspond to purging operations.

The surface temperature during printing of the upper layer of the samples was not affected by the type of IR lamp or the number of scans. The final temperature with both types of lamp reached about 140° C. However, a higher number of scans resulted in longer time between the slices, and more effective evaporation. This explains the observation that the 8 scan protocol was more effective in solvent evaporation than the 0 scan protocol, even though surface temperature is the same. On the other hand, when the IR power is doubled, as in the case of 2 NIR lamps (FIGS. 19G-I), then a higher photon fluency results in higher surface temperature, which reaches up to 200° C. The higher surface temperature, combined with a high number of scans (e.g., the 8 scans in FIG. 19I) resulted in the most effective drying (0.848% loss, in the present trial).

While using 2 NIR lamps combined with 8 scans resulted in the best solvent drying efficiency, this mode lengthens the printing process and therefore a more balanced mode would be preferable, such as, but not limited to, 2 NIR lamps with 4 scans.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of additive manufacturing of a three-dimensional object, the method comprising:

dispensing from a first array of nozzles a liquid modeling material formulation containing a polyimide precursor to form a layer in a configured pattern corresponding to a shape of a slice of the object, wherein said polyimide precursor is bismaleimide and said liquid modeling material formulation is devoid of a bis-allyl-nadi-imide compound;

applying to said layer ultraviolet radiation and infrared radiation from two different radiation sources; and repeating said dispensing and said application of radiation to form a plurality of layers in configured patterns corresponding to shapes of other slices of the object;

wherein for at least one layer, said applying said infrared radiation is by performing a plurality of scans of said infrared radiation over said layer after said formation of said layer and before dispensing a subsequent layer.

2. The method according to claim 1, wherein said applying said infrared radiation is by performing at least four scans of said infrared radiation over said layer.

3. The method according to claim 1, wherein said applying said infrared radiation is at a power of at least 750 watts.

4. The method according to claim 1, wherein said applying said infrared radiation is by at least two infrared light sources.

5. The method according to claim 1, wherein said dispensing from said first array of nozzles is by applying voltage pulses to said first array of nozzles, said voltage pulses being characterized by a pulse width of from about 6.0 μs to about 6.4 μs.

6. The method according to claim 1, wherein a viscosity of said modeling material formulation containing said polyimide precursor is from about 12 cP to about 18 cP.

7. The method according to claim 1, wherein said dispensing is executed to dispense said modeling material formulation containing said polyimide precursor in droplets having a weight of from about 50 ng to about 90 ng.

8. The method according to claim 1, wherein said dispensing comprises applying voltage at a frequency of from about 15 kHz to about 25 kHz to said first array of nozzles dispensing said modeling material formulation containing said polyimide precursor.

9. The method according to claim 1, wherein said polyimide precursor has a molecular weight of from 500 to 1000 Daltons.

10. The method according to claim 1, wherein said polyimide precursor is represented by Formula I:

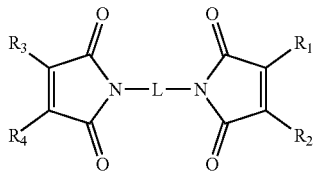

Formula I wherein:
L is a linking moiety; and
$R_1$-$R_4$ are each independently selected from hydrogen, alkyl and cycloalkyl.

11. The method according to claim 10, wherein $R_1$-$R_4$ are each hydrogen.

12. The method according to claim 10, wherein said linking moiety L is or comprises a hydrocarbon.

13. The method according to claim 12, wherein said hydrocarbon comprises two or more alkylene chains that are connected therebetween via a branching unit.

14. The method according to claim 13, wherein said branching unit comprises or consists of a cycloalkyl.

15. The method according to claim 1, wherein said modeling material formulation containing said polyimide precursor further comprises an organic solvent.

16. The method according to claim 15, wherein said organic solvent is a polar organic solvent.

17. The method according to claim 15, wherein said organic solvent has a boiling temperature lower than 190° C. and/or an evaporation rate lower than 1, or lower than 0.5.

18. The method according to claim 15, wherein a weight ratio of said polyimide precursor and said organic solvent in the modeling material formulation ranges from 50:50 to 90:10.

19. A computer software product, comprising a computer-readable medium in which program instructions are stored, which instructions, when read by a computerized controller of an additive manufacturing system, cause said system to execute the method according to claim 1.

20. A system for fabricating a three-dimensional object by additive manufacturing, the system comprising:
at least two array of nozzles, having at least a first array of nozzles configured for dispensing a modeling material containing a polyimide precursor, and a second array of nozzles configured for dispensing a support material; and
a controller having a circuit configured to execute the method according to claim 1.

21. The system of claim 20, wherein said first array of nozzles and said second array of nozzles are both located in a printing head.

22. The system of claim 20, wherein said first array of nozzles is located in a first printing head, and said second array of nozzles is located in a second printing head.

* * * * *